United States Patent
Shiodera et al.

(10) Patent No.: US 8,867,614 B2
(45) Date of Patent: Oct. 21, 2014

(54) IMAGE CODING METHOD AND IMAGE DECODING METHOD

(75) Inventors: Taichiro Shiodera, Tokyo (JP); Shinichiro Koto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 316 days.

(21) Appl. No.: 13/358,691

(22) Filed: Jan. 26, 2012

(65) Prior Publication Data
US 2012/0121012 A1 May 17, 2012

Related U.S. Application Data

(63) Continuation of application No. PCT/JP2009/063369, filed on Jul. 27, 2009.

(51) Int. Cl.
*H04N 7/30* (2006.01)
*H04N 19/13* (2014.01)
*H04N 19/14* (2014.01)
*H04N 19/176* (2014.01)
*H04N 19/60* (2014.01)
*H04N 19/61* (2014.01)
*H04N 19/124* (2014.01)
*H04N 19/18* (2014.01)

(52) U.S. Cl.
CPC ... *H04N 19/00121* (2013.01); *H04N 19/00157* (2013.01); *H04N 19/00278* (2013.01); *H04N 19/00775* (2013.01); *H04N 19/00781* (2013.01); *H04N 19/0009* (2013.01); *H04N 19/00296* (2013.01)
USPC .................................. 375/240.03; 375/240.24

(58) Field of Classification Search
CPC ................... H04N 19/00121; H04N 19/00254
USPC ........................................ 375/240.03, 240.24
See application file for complete search history.

(56) References Cited

U.S. PATENT DOCUMENTS

| 5,650,782 A | 7/1997 | Kim |
| 5,757,973 A | 5/1998 | Wilkinson et al. |
| 2003/0053704 A1* | 3/2003 | Yamaguchi et al. .......... 382/239 |

(Continued)

FOREIGN PATENT DOCUMENTS

| JP | 06-153172 | 5/1994 |
| JP | 2001-045482 | 2/2001 |
| JP | 2004-007376 | 1/2004 |

OTHER PUBLICATIONS

ITU-T Rec. H. 264, Chap. 8.5, Transform coefficient decoding process and picture construction process prior to deblocking filter process (Mar. 2005).

(Continued)

*Primary Examiner* — Sath V Perungavoor
*Assistant Examiner* — Jeffery Williams
(74) *Attorney, Agent, or Firm* — Amin, Turocy & Watson, LLP

(57) ABSTRACT

According to an embodiment, an image coding method includes a transforming and quantizing step of orthogonally transforming and quantizing each of a plurality of blocks as a unit within a target region of an input image to obtain coefficients; and a variable-length coding step of coding a plurality of coefficient strings each having coefficients of same frequency component among the blocks within the target region by using a plurality of variable length coding schemes: The variable-length coding step includes switching among the variable-length coding schemes for each coefficient string.

22 Claims, 27 Drawing Sheets

(56) References Cited

U.S. PATENT DOCUMENTS

| | | |
|---|---|---|
| 2004/0174278 A1 | 9/2004 | Kadono et al. |
| 2005/0141616 A1* | 6/2005 | Lim .................... 375/240.16 |
| 2007/0165959 A1 | 7/2007 | Takada |
| 2008/0170625 A1* | 7/2008 | Tian et al. ............ 375/240.23 |

OTHER PUBLICATIONS

International Search Report for International Application No. PCT/JP2009/063369 mailed on Nov. 2, 2009.

Written Opinion for International Application No. PCT/JP2009/063369 mailed on Nov. 2, 2009.

* cited by examiner

FIG.7

| PREDICTION RESIDUAL ERROR | k=0 prefix | k=0 suffix | k=1 prefix | k=1 suffix | k=2 prefix | k=2 suffix | k=3 prefix | k=3 suffix |
|---|---|---|---|---|---|---|---|---|
| 0 | 1 | - | 1 | 0 | 1 | 00 | 1 | 000 |
| -1 | 01 | - | 1 | 1 | 1 | 01 | 1 | 001 |
| 1 | 001 | - | 01 | 0 | 1 | 10 | 1 | 010 |
| -2 | 0001 | - | 01 | 1 | 1 | 11 | 1 | 011 |
| 2 | 00001 | - | 001 | 0 | 01 | 00 | 1 | 100 |
| -3 | 000001 | - | 001 | 1 | 01 | 01 | 1 | 101 |
| 3 | 0000001 | - | 0001 | 0 | 01 | 10 | 1 | 110 |
| -4 | 00000001 | - | 0001 | 1 | 01 | 11 | 1 | 111 |
| 4 | 000000001 | - | 00001 | 0 | 001 | 00 | 01 | 000 |
| -5 | 0000000001 | - | 00001 | 1 | 001 | 01 | 01 | 001 |
| 5 | 00000000001 | - | 000001 | 0 | 001 | 10 | 01 | 010 |
| -6 | 000000000001 | - | 000001 | 1 | 001 | 11 | 01 | 011 |
| 6 | 0000000000001 | - | 0000001 | 0 | 0001 | 00 | 01 | 100 |
| -7 | 00000000000001 | - | 0000001 | 1 | 0001 | 01 | 01 | 101 |
| 7 | 000000000000001 | - | 00000001 | 0 | 0001 | 10 | 01 | 110 |
| -8 | 0000000000000001 | - | 00000001 | 1 | 0001 | 11 | 01 | 111 |
| ... | ... | ... | ... | ... | ... | ... | ... | ... |

FIG.9

| SYMBOL POSITION (num) | CODING TARGET SYMBOL (QUANTIZED TRANSFORM COEFFICIENT) | OUTPUT DATA | |
|---|---|---|---|
| 0 | 0 | NONE | |
| 1 | 0 | NONE | |
| 2 | 0 | NONE | |
| 3 | 0 | NONE | |
| 4 | 0 | NONE | |
| 5 | 1 | run=5 | value=1 |
| 6 | 1 | NONE | |
| 7 | 1 | NONE | |
| 8 | 0 | run=3 | value=0 |
| 9 | 4 | run=0 | value=4 |
| 10 | -5 | run=0 | value=-5 |
| 11 | 0 | run=0 | value=0 |
| 12 | 0 | NONE | |
| 13 | 0 | NONE | |
| 14 | 0 | NONE | |
| 15 | 0 | run=4 | |

FIG.10

| SYMBOL POSITION (num) | CODING TARGET SYMBOL (QUANTIZED TRANSFORM COEFFICIENT) | GROUP | OUTPUT DATA | |
|---|---|---|---|---|
| 0 | 0 | 0 | skipflag=TRUE | NONE |
| 1 | 0 | | | NONE |
| 2 | 0 | | | NONE |
| 3 | 0 | | | NONE |
| 4 | 0 | 1 | skipflag=FALSE | value=0 |
| 5 | 1 | | | value=1 |
| 6 | 1 | | | value=1 |
| 7 | 1 | | | value=1 |
| 8 | 0 | 2 | skipflag=FALSE | value=0 |
| 9 | 4 | | | value=4 |
| 10 | -5 | | | value=-5 |
| 11 | 0 | | | value=0 |
| 12 | 0 | 3 | skipflag=TRUE | NONE |
| 13 | 0 | | | NONE |
| 14 | 0 | | | NONE |
| 15 | 0 | | | NONE |

FRAME TO BE CODED

FIG.13

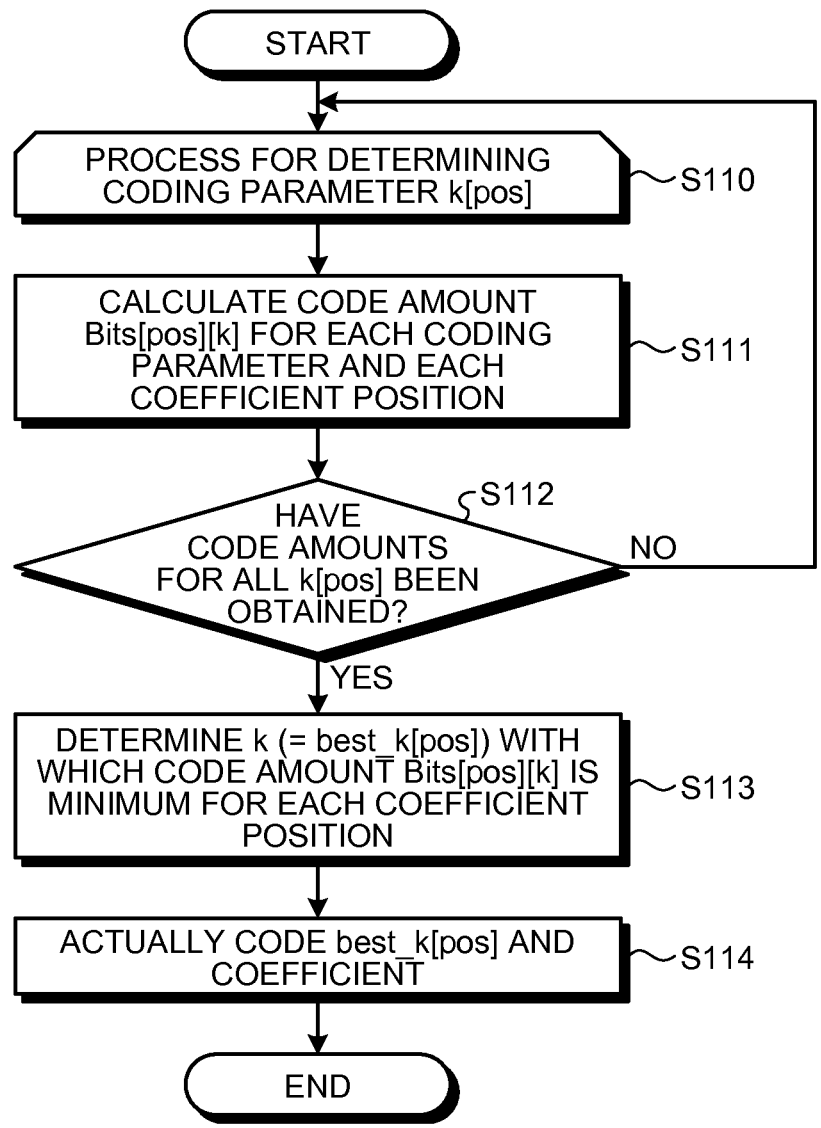

FIG.17A

```
header( ) {
    ...
    for(pos=0; pos<NUM_POS; pos++) {
        CodingMethodFlag [pos]
    }
    ...
}
```

FIG.17B

```
block( ) {
    ...
    for(seg=0; seg<NUM_SEG; seg++) {
        pred_mode
        for(pos=0; pos<NUM_POS; pos++) {
            CodingParamIdx[pos]
        }
        for(blk=0; blk<NUM_BLK; blk++) {
            subblock( );
        }
        for(pos=0; pos<NUM_POS; pos++) {
            if(CodingMethodFlag [pos]==FALSE && state[pos]==0 && run[pos]>0)
                run[pos]
        }
    }
    ...
}
```

FIG.17C

| |
|---|
| subblock( ) { |
| ... |
|   for(pos=0; pos<NUM_POS; pos++) { |
|     if(CodingMethodFlag [pos]==TRUE) { |
|       //Golomb-Rice code |
|       coef[blk][pos] |
|     }else{ |
|       //Run-length code |
|       if(coef[blk][pos] !=state[pos]) { |
|         run[pos] |
|         coef[blk][pos] |
|       } |
|     } |
|   } |
| ... |
| } |

FIG.18A

| |
|---|
| header( ) { |
| ... |
| for(pos=0; pos<NUM_POS; pos++) { |
|   CodingMethodFlag [pos] |
| } |
| ... |
| } |

FIG.18B

| |
|---|
| block( ) { |
| ... |
|  for(seg=0; seg<NUM_SEG; seg++) { |
|   pred_mode |
|   for(pos=0; pos<NUM_POS; pos++) { |
|    CodingParamIdx[pos] |
|    if(CodingMethodFlag [pos]==TRUE) { |
|     //Golomb-Rice code |
|     for(blk=0; blk<NUM_BLK; blk++) { |
|      coef[blk][pos] |
|     } |
|    }else |
|     //Run-length code |
|     for(blk=0; blk<NUM_BLK; blk++) { |
|      if(coef[blk][pos] !=state[pos]) { |
|       run[pos] |
|        coef[blk][pos] |
|      } |
|     } |
|     if(state[pos]==0 && run[pos]>0) run[pos] |
|    } |
|   } |
|  } |
| ... |
| } |

| QUANTIZATION PARAMETER ($QP_n$) | QUANTIZATION STEP SIZE |
|---|---|
| 0 | 1 |
| 1 | 3 |
| 2 | 5 |
| 3 | 9 |
| 4 | 17 |
| 5 | 31 |
| ⋮ | ⋮ |

FIG.22A

|       | CodingMethodFlag [pos] (COEFFICIENT POSITION: pos) | | | |
|-------|-------|-------|-------|-------|
| QP    | LL    | LH    | HL    | HH    |
| 0     | TRUE  | TRUE  | TRUE  | TRUE  |
| 1     | TRUE  | TRUE  | TRUE  | TRUE  |
| 2     | TRUE  | TRUE  | TRUE  | FALSE |
| 3     | TRUE  | TRUE  | TRUE  | FALSE |
| 4     | TRUE  | TRUE  | TRUE  | FALSE |
| 5     | TRUE  | FALSE | FALSE | FALSE |
| 6     | TRUE  | FALSE | FALSE | FALSE |
| 7     | TRUE  | FALSE | FALSE | FALSE |
| 8     | FALSE | FALSE | FALSE | FALSE |
| ...   |       |       |       |       |
| QPmax | FALSE | FALSE | FALSE | FALSE |

FIG.22B

|                  | CodingMethodFlag [pos] (COEFFICIENT POSITION: pos) | | | |
|------------------|-------|-------|-------|-------|
| COMPRESSION RATE | LL    | LH    | HL    | HH    |
| 1 TO 1/2         | TRUE  | TRUE  | TRUE  | TRUE  |
| 1/2 TO 1/4       | TRUE  | TRUE  | TRUE  | FALSE |
| 1/4 TO 1/6       | TRUE  | FALSE | FALSE | FALSE |
| MORE THAN 1/6    | FALSE | FALSE | FALSE | FALSE |

FIG.22C

| COMPRESSION RATE | COLOR SIGNAL | CodingMethodFlag [pos] (COEFFICIENT POSITION: pos) | | | |
|---|---|---|---|---|---|
| | | LL | LH | HL | HH |
| 1 TO 1/2 | Y | TRUE | TRUE | TRUE | TRUE |
| | U, V | TRUE | TRUE | TRUE | FALSE |
| 1/2 TO 1/4 | Y | TRUE | TRUE | TRUE | FALSE |
| | U, V | TRUE | FALSE | FALSE | FALSE |
| 1/4 TO 1/6 | Y | TRUE | FALSE | FALSE | FALSE |
| | U, V | FALSE | FALSE | FALSE | FALSE |
| MORE THAN 1/6 | Y | TRUE | FALSE | FALSE | FALSE |
| | U, V | FALSE | FALSE | FALSE | FALSE |

FIG.22D

| COMPRESSION RATE | COLOR SIGNAL | PREDICTION DIRECTION | CodingMethodFlag [pos] (COEFFICIENT POSITION: pos) | | | |
|---|---|---|---|---|---|---|
| | | | LL | LH | HL | HH |
| 1/4 TO 1/6 | Y | VERTICAL | TRUE | TRUE | FALSE | FALSE |
| | | HORIZONTAL | TRUE | FALSE | TRUE | FALSE |
| | | OTHER | TRUE | FALSE | FALSE | FALSE |

IMAGE CODING METHOD AND IMAGE DECODING METHOD

CROSS-REFERENCE TO RELATED APPLICATIONS

This application is a continuation of PCT international application Ser. No. PCT/JP2009/063369 filed on Jul. 27, 2009 which designates the United States; the entire contents of which are incorporated herein by reference.

FIELD

The present embodiment relates to image coding.

BACKGROUND

Methods for coding moving image data to compress have been conventionally known. In such a method, prediction, transform and entropy coding are typically performed in units of rectangular blocks of a specific size such as 8 pixels×8 pixels. For example, in AVC/H.264, a coded block is predicted, two-dimensional transform coefficients resulting from DCT and quantization are zigzag-scanned into one-dimensional data, and furthermore, variable length coding tables are adaptively switched based on the number of DCT coefficients in adjacent blocks to code the transform coefficients.

Japanese Patent No. 3337583 (U.S. Pat. No. 5,650,782) provides for improvement of the coding efficiency by scanning two-dimensional transform coefficients resulting from transform and quantization, selecting one of a plurality of variable length coding tables optimized in terms of frequencies of runs and levels according to a quantization parameter.

In an image processing LSI (large-scale integration) or the like used in a device, a memory band width and the like are limited because of various restrictions such as circuit layout, and a coded block may thus need to have a small size such as 2 pixels×2 pixels. In AVC/H.264 and Japanese Patent No. 3337583, however, since transform coefficients are converted into one-dimensional data in units of a coded block, the number of runs does not increase when the size of the coded block is small, and the coding efficiency does not necessarily improved.

Moreover, since the variable-length coding tables are switched in units of a block in Japanese Patent No. 3337583, coding using the relation between the transform coefficients and the spatial frequencies cannot be performed, and the coding efficiency is not necessarily improved.

BRIEF DESCRIPTION OF THE DRAWINGS

FIG. 7 is a table illustrating Golomb-Rice codes;

FIG. 9 is a table illustrating an example of run-length encoding;

FIG. 10 is a table illustrating an example of skip coding;

FIG. 13 is a diagram expressing an image block and small blocks by coefficient positions;

FIG. 16 is a flowchart illustrating processes for determining a coding parameter k;

FIGS. 17A-17C are each a diagram illustrating a first syntax;

FIGS. 18A and 18B are each a diagram illustrating a second syntax;

FIG. 22A is a table illustrating a flag CodingMethodFlag at each coefficient position with respect to $QP_n$;

FIG. 22B is a table illustrating a flag CodingMethodFlag at each coefficient position with respect to a target code amount;

FIG. 22C is a table illustrating a flag CodingMethodFlag at each coefficient position with respect to a prediction direction;

FIG. 22D is a table illustrating a flag CodingMethodFlag at each coefficient position with respect to image signal components;

DETAILED DESCRIPTION

According to an embodiment, an image coding method includes a transforming and quantizing step of orthogonally transforming and quantizing each of a plurality of blocks as a unit within a target region of an input image to obtain coefficients; and a variable-length coding step of coding a plurality of coefficient strings each having coefficients of same frequency component among the blocks within the target region by using a plurality of variable length coding schemes: The variable-length coding step includes switching among the variable-length coding schemes for each coefficient string.

First Embodiment

Figure 1A:
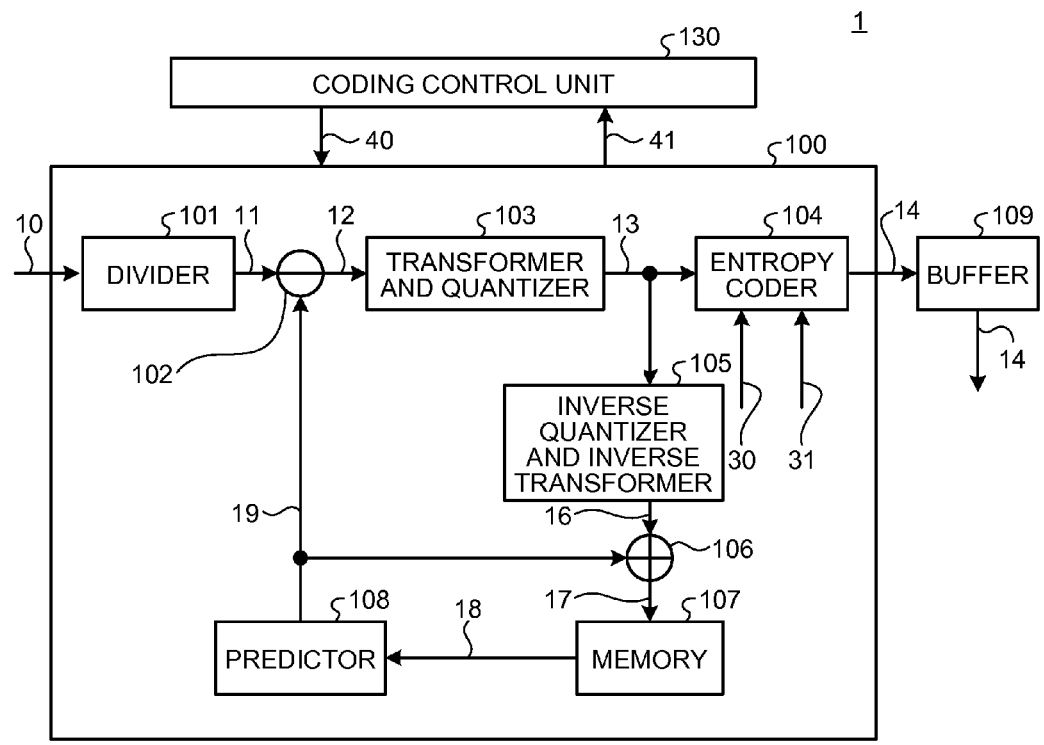
FIG. 1A is a diagram illustrating an image coding device according to a first embodiment.

A first embodiment will be described below with reference to the drawings. FIG. 1A is a block diagram illustrating an example of a configuration of an image coding device 1 that can be applied to the first embodiment of the present invention. The image coding device 1 includes an image coding unit 100, a coding control unit 130 and a buffer 109.

An image block 10 obtained by dividing moving image data into a predetermined size is input to the image coding unit 100. The image coding unit 100 divides the input image block 10 into small blocks 11 of a predetermined size according to control of the coding control unit 130. The image coding unit 100 performs transform and quantization, predictive coding and entropy coding based on the small blocks 11 to generate coded data 14.

The coded data 14 are temporarily accumulated in the buffer 109 and output from the image coding device 1 in units of a frame, for example. Note that the processes in the image coding unit 100 are respectively performed on image signal components (luminance component Y, chrominance components U, V, for example) of the moving image data.

An example of a configuration of the image coding unit 100 will be described in more detail. In FIG. 1, the image coding unit 100 includes a divider 101, a subtractor 102, a transformer and quantizer 103, an entropy coder 104, an inverse quantizer and inverse transformer 105, and adder 106, a memory 107 and a predictor 108, and is controlled by the coding control unit 130.

The coding control unit 130 supplies coding control information 40 for controlling overall coding processes performed by the image coding device 1 to the image coding unit 100. The coding control unit 130 also receives, as necessary, feedback information 41 output based on a result of the coding processes at the image coding unit 100. The coding control information 40 includes mode information 31, coding method information 30 and the like. The mode information 31 includes information necessary for decoding other than the transform coefficients, such as prediction mode information indicating a prediction mode, which will be described later, quantization information including parameters relating to quantization such as a quantization parameter (QP), a quantization width (quantization step size) and a quantization matrix. The feedback information 41 includes code amount information indicating a generated code amount in the image coding unit 100.

The image coding unit 100 is implemented by hardware such as circuits integrated on an LSI (large-scale integration) chip, for example. In this case, the coding control unit 130 may be implemented by executing programs on a CPU (central processing unit) connected to the LSI, or may be configured by hardware similarly to the image coding unit 100. The image coding unit 100 may also be implemented by executing image coding programs on the CPU of a computer or the like together with the coding control unit 130.

The input image block 10 is divided in units of a block of a predetermined size by the divider 101 into small blocks 11. Note that the image block 10 is one frame of image data or a region resulting from dividing one frame of image data. For example, the image block 10 is a block of n pixels×m pixels (n and m are natural numbers), and a pixel line including one line of pixel data and a block line including a plurality of lines of pixel data are also included in the concept of an image block. A small block 11 is a block of N pixels×M pixels (N and M are natural numbers, $N \leq n$ and $M \leq m$), for example. In the image coding unit 100, predictive coding, transform and the like are performed in units of the small block 11.

A small block 11 output from the divider 101 is supplied to the subtractor 102. The subtractor 102 subtracts a predicted image signal 19 output from the predictor 108, which will be described later, from the supplied small block 11 to generate a prediction error signal 12. The prediction error signal 12 is supplied to the transformer and quantizer 103.

The transformer and quantizer 103 first performs predetermined transform on the supplied prediction error signal 12 to generate transform coefficients. In this case, orthogonal transform such as Hadamard transform or DCT (discrete cosine transform) is used as the transform. Alternatively, the transform coefficients may be generated by using a technique such as wavelet transform or independent component analysis.

Figure 2A:
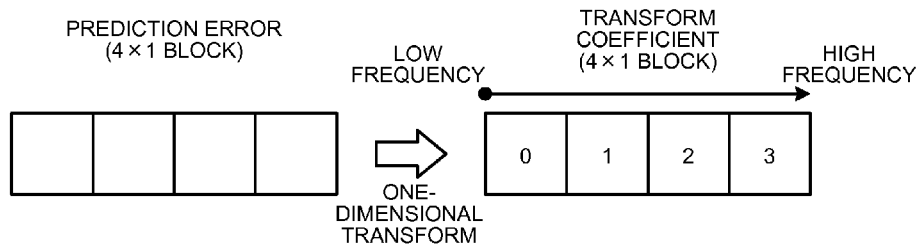
FIGS. 2A-2C are each a diagram for explaining orthogonal transform.

Examples of the orthogonal transform will be described with reference to FIGS. 2A, 2B and 2C. FIG. 2A illustrates an example of 4×1 transform, FIG. 2B illustrates an example of 2×2 transform, and FIG. 2C illustrates an example of 4×4 transform.

In 4×1 transform, as illustrated in FIG. 2A, small blocks 11 of 4 pixels×1 pixel are generated by the divider 101, and one-dimensional horizontal orthogonal transform is applied to a prediction error signal 12 in a block of 4 pixels×1 pixel. The transform coefficients resulting from the orthogonal transform are decomposed into spatial frequency components. In the example of FIG. 2A, a position indicated by a value "0" represents a DC component with the lowest spatial frequency, and a position with a larger value represents a component with higher spatial frequency.

Figure 2B:
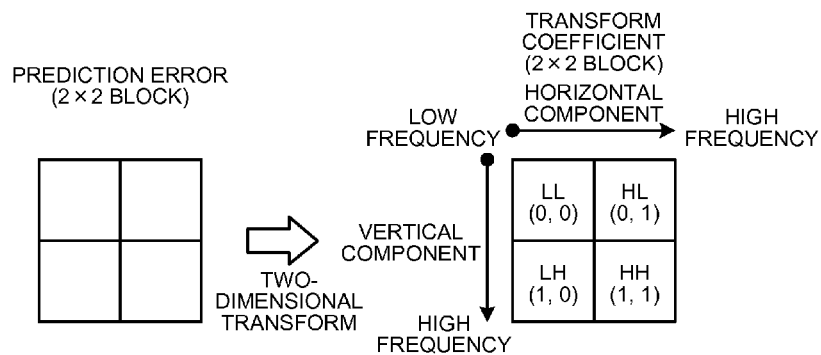
Figure 2C:
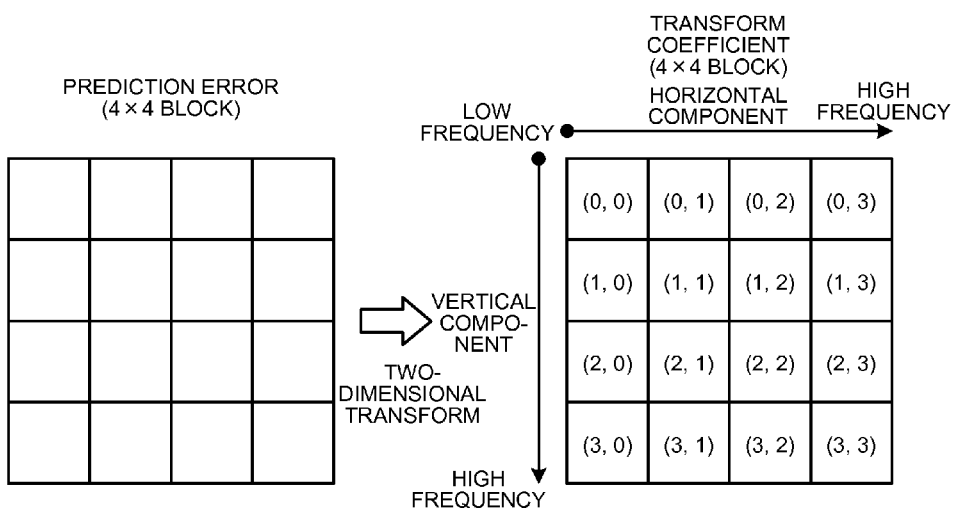

In 2×2 transform, as illustrated in FIG. 2B, small blocks 11 of 2 pixels×2 pixels are generated by the divider 101, and two-dimensional orthogonal transform in the horizontal and vertical directions is applied to a prediction error signal 12 in a block of 2 pixels×2 pixels. A value x of (x, y) in FIG. 2B represents a position of a spatial frequency component in the vertical direction and a value y thereof represents a position of the spatial frequency component in the horizontal direction, and a higher spatial frequency component is represented as each of the values is larger. In the example of FIG. 2B, a position indicated by upper-left values (0, 0) represents a DC component with the lowest spatial frequency, and a position indicated by lower-right values (1, 1) represents the highest spatial frequency component.

In the following, the components are expressed in a manner that the value "0" and the value "1" representing a position in the 2×2 transform are replaced by "L" meaning low and "H" meaning high, respectively, and in the order of the vertical direction and the horizontal direction. For example, the components are expressed as appropriate in a manner that a DC component with values (0, 0) is expressed as an LL component, and respective AC components are expressed as an HL component, an LH component and an HH component.

In 4×4 transform, as illustrated in FIG. 2C, small blocks 11 of 4 pixels×4 pixels are generated by the divider 101, and two-dimensional orthogonal transform in the horizontal and vertical directions is applied to a prediction error signal 12 in a block of 4 pixels×4 pixels. In the example of FIG. 2C, a value x and a value y of (x, y) represent a position of a spatial frequency component in the vertical direction and in the horizontal direction, respectively, and a higher spatial frequency component is represented as each of the values is larger. Values (0, 0) represent a position of a DC component, and values (3, 3) represent a position of the highest spatial frequency component.

The transformer and quantizer 103 quantizes the transform coefficients generated as described above based on a quantization parameter QP set in the coding control unit 130, which will be described later, and generates quantized transform coefficients 13 that are quantized version of the transform coefficients. The quantized transform coefficients 13 are supplied to the entropy coder 104 and also to the inverse quantizer and inverse transformer 105.

The inverse quantizer and inverse transformer 105 inverse quantizes the quantized transform coefficients 13 according to the quantization parameter QP set in the coding control unit 130 to restore the quantized transform coefficients 13. The inverse quantizer and inverse transformer 105 then performs transform inverse of the transform performed by the transformer and quantizer 103 on the restored quantized transform coefficients 13 to generate a restored prediction error signal 16 that is a restored version of the original prediction error signal 12. The restored prediction error signal 16 is supplied to the adder 106. The adder 106 adds the restored prediction error signal 16 and a predicted image signal 19 output from the predictor 108 to generate a restored small block signal 17 that is a restored version of the original small block 11.

The restored small block signal 17 is stored in the memory 107, supplied to the predictor 108 as a reference pixel signal 18, and used for prediction of a small block 11 to be coded later.

The predictor 108 applies intra prediction to the small block 11 output from the divider 101. FIGS. 3A to 3E illustrate specific examples of intra prediction. FIGS. 3A to 3E illustrate five types of prediction modes with different prediction directions. Specifically, in intra prediction, a pixel value of a block to be predicted (a block of 2 pixels×2 pixels in this example) out of the reference pixel signals 18 stored in the memory 107 is predicted by using a pixel signal spatially adjacent to the block.

More specifically, a predicted image signal 19 is generated by copying a luminance value of the reference pixel signal 18 along the prediction direction to the block to be predicted by taking advantage of the fact that adjacent pixels in an image have high correlation with each other. In FIGS. 3A to 3E, boxes with characters "a" to "d" are pixels to be predicted (hereinafter referred to as prediction target pixels), and shaded boxes with characters "A" to "G" are pixels based on the reference pixel signal 18 (hereinafter referred to as reference pixels).

Figure 3A:
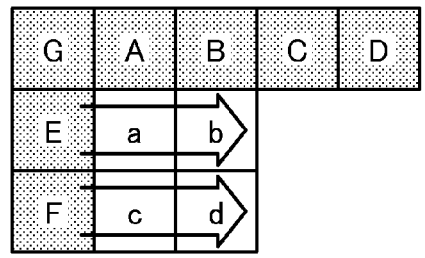
FIGS. 3A-3E are each a diagram illustrating intra prediction.
Figure 3B:
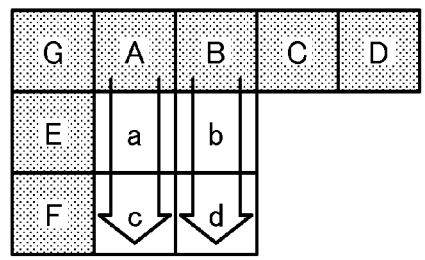

FIG. 3A illustrates an example in which prediction is performed in the horizontal direction. Specifically, the reference pixel "E" is copied to the prediction target pixels "a" and "b" arranged adjacent thereto in the horizontal direction, and the reference pixel "F" is copied to the prediction target pixels "c" and "d" arranged adjacent thereto in the horizontal direction. FIG. 3B illustrates an example in which prediction is performed in the vertical direction. Specifically, the reference pixel "A" is copied to the prediction target pixels "a" and "c" arranged adjacent thereto in the vertical direction, and the reference pixel "B" is copied to the prediction target pixels "b" and "d" arranged adjacent thereto in the vertical direction.

Figure 3C:
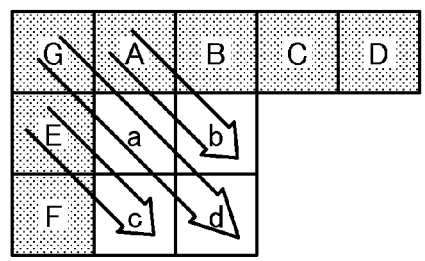
Figure 3D:
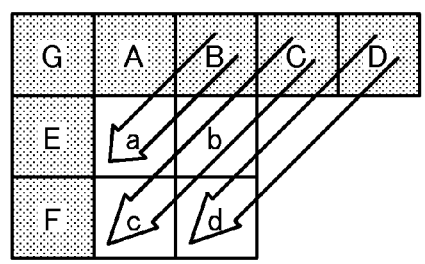

In addition, FIG. 3C illustrates an example in which prediction is performed diagonally from upper-left to lower-right. Specifically, the reference pixel "E" is copied to the prediction target pixel "a" on the lower right thereof, and the reference pixel "G" is copied to the prediction target pixels "a" and "d" on the lower right thereof. Then, the reference pixel "A" is copied to the prediction target pixel "b" on the lower right thereof. FIG. 3D illustrates an example in which prediction is performed diagonally from upper-right to lower-left. Specifically, the reference pixel "B" is copied to the prediction target pixel "a" on the lower left thereof, and the reference pixel "C" is copied to the prediction target pixels "b" and "c" on the lower left thereof. Then, the reference pixel "D" is copied to the prediction target pixel "b" on the lower left thereof.

Figure 3E:
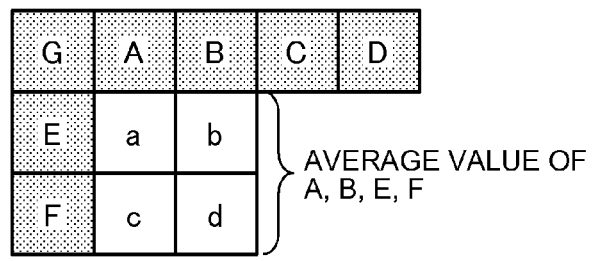

Furthermore, FIG. 3E illustrates an example in which prediction is performed using an average value of reference pixels adjacent to a block to be predicted. Specifically, an average value of luminance values of the reference pixels "A", "B", "E" and "F" is obtained and the average value is copied to each of the prediction target pixels "a" to "d".

The predicted image signal 19 predicted in this manner by the predictor 108 is supplied to the subtractor 102 described above.

Figure 1B:
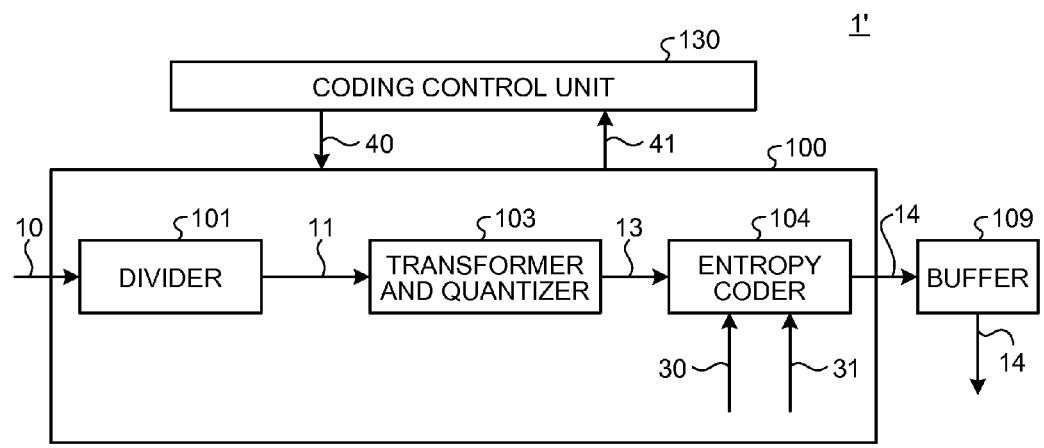
FIG. 1B is a diagram illustrating another image coding device according to the first embodiment.

Note that the predicting method at the predictor 108 is not limited to the examples described above. For example, MED (median edge detection) prediction employed in plane prediction and JPEG-LS (joint photographic experts group-LS) and gradient adaptive prediction used in the CALIC (context-based adaptive lossless image coding) scheme may be used. In addition, if no adjacent reference pixels are present for a block to be predicted at a boundary of a picture or the like, the prediction value may be set to "0" without performing prediction, or a fixed value such as a value "128" may be used as the prediction value to be the predicted image signal 19. Furthermore, inter prediction employed in H.264/AVC may be applied to the predictor 108. As illustrated in FIG. 1B as an image coding device 1', a configuration in which the predictor 108 is excluded from the image coding device 1 described above may be employed. In this case, prediction is not performed and the image block 10 is directly input to the transformer and quantizer 103. When the predictor 108 is excluded, other components relating to prediction, which are the subtractor 102, the inverse quantizer and inverse transformer 105, the adder 106 and the memory 107, are not needed.

On the other hand, the entropy coder 104 entropy-codes the quantized transform coefficients 13 supplied from the transformer and quantizer 103 based on a coding parameter obtained from the coding control unit 130 or the like, and outputs the coded result as coded data 14. Fixed-length source coding, Huffman coding, arithmetic coding or the like can be used for the entropy coding scheme.

In addition, the coding parameters used by the entropy coder 104 include the coding method information 30 and mode information 31 such as prediction mode information and quantization parameter information included in the coding control information 40. The coding parameters include various parameters such as the transform coefficients and information on quantization in the transformer and quantizer 103 that are necessary for decoding.

The coded data 14 generated by the entropy coder 104 are output from the image coding unit 100, subjected to multiplexing, which is not illustrated, and temporarily accumulated in the buffer 109. The coded data 14 accumulated in the buffer 109 are output as the coded data 14 outside of the image coding device 1, for example, at an output timing managed by the coding control unit 130. The coded data 14 output from the image coding device 1 are stored in a storage medium such as a hard disk or a semiconductor memory or transmitted by a transmission system such as a communication line, for example.

Figure 4:
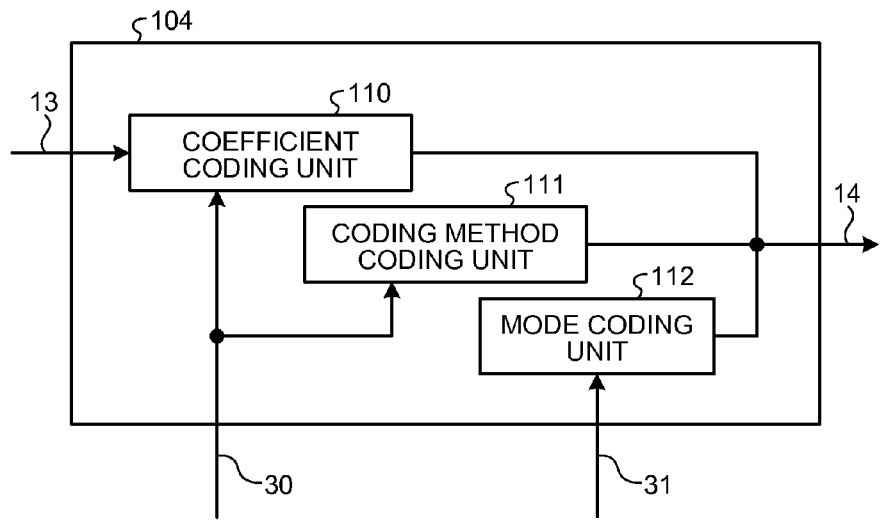
FIG. 4 is a diagram illustrating an entropy coder according to the first embodiment.

Next, the entropy coder 104 in the image coding device 1 will be described in more detail. FIG. 4 is a block diagram illustrating an example of a configuration of the entropy coder 104 that can be applied to the first embodiment. In FIG. 4, the entropy coder 104 includes a coefficient coding unit 110, a coding method coding unit 111 and a mode coding unit 112.

The quantized transform coefficients 13 output from the transformer and quantizer 103 are input to the coefficient coding unit 110. In addition, the coding method information 30 is input to the coefficient coding unit 110 and the coding method coding unit 111. In addition, the mode information 31 is input to the mode coding unit 112.

The coding method information 30 is information for specifying the method for coding the quantized transform coefficients 13 at the coefficient coding unit 110. More specifically, the coding method information 30 indicates a variable-length coding method for each coefficient position, which will be described later, in predetermined units of image such as in units of a small block, in units of an input image signal, in units of a frame or in units of a sequence, for example. The mode information 31 is information other than the transform coefficients necessary for decoding. For example, the mode information 31 includes quantization parameter information indicating the quantization parameter QP used in quantization at the transformer and quantizer 103 and positional information indicating positions of the transform coefficients resulting from the orthogonal transform.

Note that the positions of the transform coefficients are positions of the transform coefficients resulting from the orthogonal transform when the directions of spatial frequency components are assumed to be coordinate axes and spatial frequencies are assumed to be coordinate values. That is, the coefficient positions correspond to spatial frequency components in the orthogonal transform. As an example, in the example of FIG. 2B described above, each of the coordinate axes in the horizontal direction and the vertical direction is divided into two, which are a low-frequency component (L) and a high-frequency component (H), whereby the position of each transform coefficient is represented. Specifically, in the example of FIG. 2B, the position of the transform coefficient is represented as coordinates (L, L), coordinates (H, L), coordinates (L, H) or coordinates (H, H).

In the following, the positions of the transform coefficients of the coordinates (L, L), the coordinates (H, L), the coordinates (L, H) and the coordinates (H, H) in the case of 2×2 transform will be expressed as a position LL, a position HL, a position LH and a position HH, respectively.

These coding method information 30 and mode information 31 are supplied from outside of the image coding unit 100. For example, the coding method information 30 and the mode information 31 are generated at the coding control unit 130, contained in the coding control information 40, supplied to the image coding unit 100 and input to the entropy coder 104.

The coefficient coding unit 110 performs entropy coding of the quantized transform coefficients 13 according to the coding method information 30 while switching the coding method for each coefficient position in predetermined units of image such as in units of the image block 10, for example. On the other hand, the coding method coding unit 111 codes the coding method information 30, and the mode coding unit 112 codes the mode information 31. The coded output from the coding method coding unit 111 and the coded output from the mode coding unit 112 are embedded in the coded output from the coefficient coding unit 110 and output from the entropy coder 104 as the coded data 14.

Figure 5:
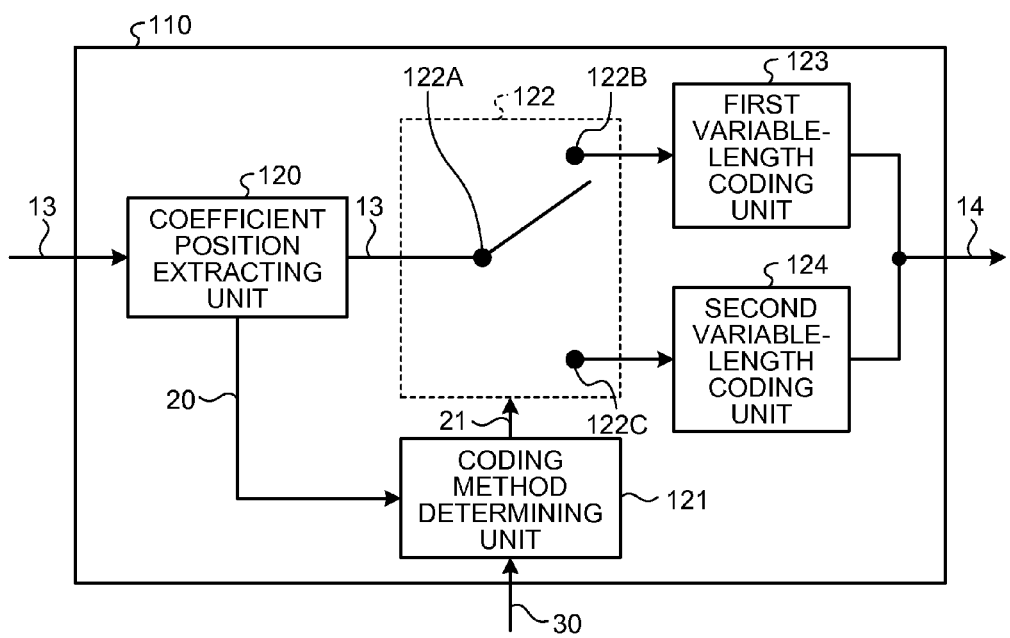
FIG. 5 is a diagram illustrating a coefficient coding unit according to the first embodiment.

Next, the coefficient coding unit 110 in the entropy coder 104 described above will be described in more detail. FIG. 5 is a block diagram illustrating an example of a configuration of the coefficient coding unit 110 according to the first embodiment. The coefficient coding unit 110 includes a coefficient position extracting unit 120, a coding method determining unit 121, a switching unit 122, a first variable-length coding unit 123 and a second variable-length coding unit 124.

The quantized transform coefficients 13 are input to the coefficient coding unit 110 and supplied to the coefficient position extracting unit 120. The coefficient position extracting unit 120 supplies the supplied quantized transform coefficients 13 to an input terminal 122A of the switching unit 122, extracts coefficient positions from the quantized transform coefficients 13, and outputs coefficient position information 20 indicating the coefficient positions. For example, the coefficient positions of the quantized transform coefficients 13 in a small block 11 can be known by counting the quantized transform coefficients 13 for each small block 11.

The switching unit 122 switches between output terminals 122B and 122C according to a switching signal 21 output from the coding method determining unit 121, which will be described later. The first variable-length coding unit 123 and the second variable-length coding unit 124 are connected to the output terminals 122B and 122C, respectively. Specifically, the quantized transform coefficients 13 supplied to the input terminal 122A are selectively supplied to either one of the first variable-length coding unit 123 and the second variable-length coding unit 124 according to the switching signal 21.

Figure 6A:
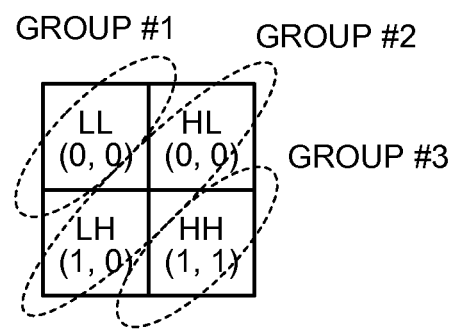
FIGS. 6A and 6B are each a diagram illustrating grouping of coefficient positions.
Figure 6B:
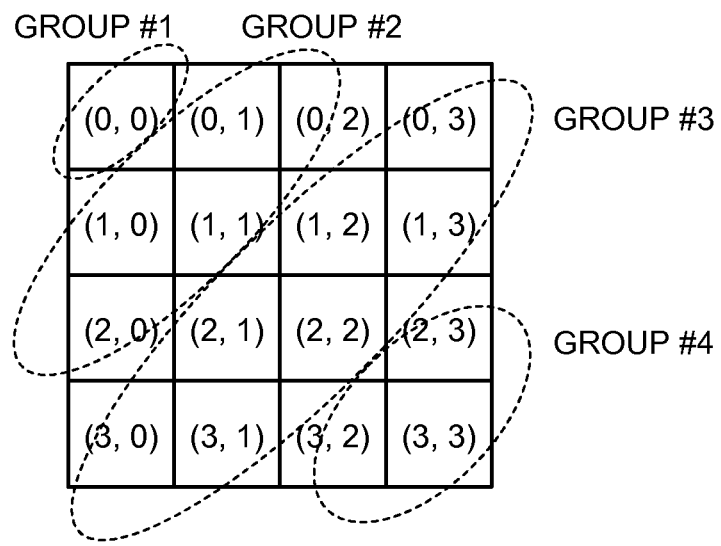

The coefficient position information 20 may indicate information in units of the coefficient position, or may indicate information in units of a group obtained by grouping according to coefficient positions. FIGS. 6A and 6B illustrate examples of grouping the coefficient positions. In the examples of FIGS. 6A and 6B, grouping is made based on the coefficient positions, namely spatial frequencies, integrating horizontal and vertical components.

FIG. 6A illustrates an example in which the coefficient positions are grouped into three groups in 2×2 transform. In the example of FIG. 6A, grouping is made into three groups of a group #1 in which both the horizontal component and the vertical component are low frequency components (L), a group #2 in which one of the horizontal component and the vertical component is the low frequency component, and a group #3 in which both the horizontal component and the vertical component are high frequency components (H).

FIG. 6B illustrates an example in which the coefficient positions are grouped into four groups in 4×4 transform. In the example of FIG. 6B, grouping is made, in a case where the spatial frequencies are divided into four levels of 0 to 3, into four groups of a group #1 in which a total value of the horizontal and vertical components is 0, a group #2 in which the total value is 1 or 2, a group #3 in which the total value is 3 or 4, and a group #4 in which the total value is 5 or larger.

The coefficient position information 20 is supplied to the coding method determining unit 121. The coding method determining unit 121 is also supplied with the coding method information 30. The coding method determining unit 121 outputs the switching signal 21 in units of the coefficient position or in units of the position group based on the coefficient position information 20 and the coding method information 30, and supplies the switching signal 21 to the switching unit 122. As a result, the switching unit 122 is switched in units of the coefficient position or position group based on the coding method information 30. The quantized transform coefficients 13 are supplied to the first variable-length coding unit 123 or the second variable-length coding unit 124 adaptively in units of the coefficient position or in units of the position group.

First variable-length coding performed at the first variable-length coding unit 123 and second variable-length coding performed at the second variable-length coding unit 124 will be described here. In the first variable-length coding unit 123, single-symbol coding that assigns one symbol for each quantized transform coefficient 13 is applied as the first variable-length coding. Golomb-Rice coding, Huffman coding and fixed-length coding are known as typical examples of such single-symbol coding.

FIG. 7 illustrates an example of Golomb-Rice codes. A Golomb-Rice code is a code combining a string "prefix" of variable-length unary codes and a fixed-length code string "suffix". FIG. 7 illustrates coded strings obtained by coding prediction residual errors according to the values of the code length k of the code string "suffix". Information on what value of the code length k is used in coding is required for decoding a Golomb-Rice code. Accordingly, the value of the code length k is passed to the decoding side as a coding parameter of the Golomb-Rice code.

Note that when Huffman coding is used as the first variable-length coding, information indicating a probability model determining a code table of Huffman coding given in advance is passed to the decoding side as a coding parameter k.

In the second variable-length coding unit 124, multiple-symbol coding capable of assigning a code for a plurality of symbols at the same coefficient position at a time to the supplied quantized transform coefficients 13 is applied as the second variable-length coding. Run-length coding and skip coding are known as typical examples of such multiple-symbol coding.

An outline of the run-length encoding will be described. The run-length encoding is a coding scheme in which a series of symbols is expressed by a value ("value") of data and the number of consecutions (the number of runs "run") of the data. When the same symbol is consecutively repeated, the run-length encoding allows the consecutive symbols to be coded at a time, and thus high coding efficiency is expected for a flat image or the like. In the run-length encoding, the number of runs is counted (incremented) when a symbol is equal to a held state ("state"), and the value ("value") of a symbol is coded when the symbol is other than that in the held state ("state"). Golomb-Rice coding, fixed-length coding or the like can be employed as the coding scheme for coding the symbol other than that in the held state ("state"). The number of runs "run" is coded by using Golomb-Rice coding, Huffman coding or fixed-length coding depending on the number of small blocks 11 in the image block 10.

Figure 8:
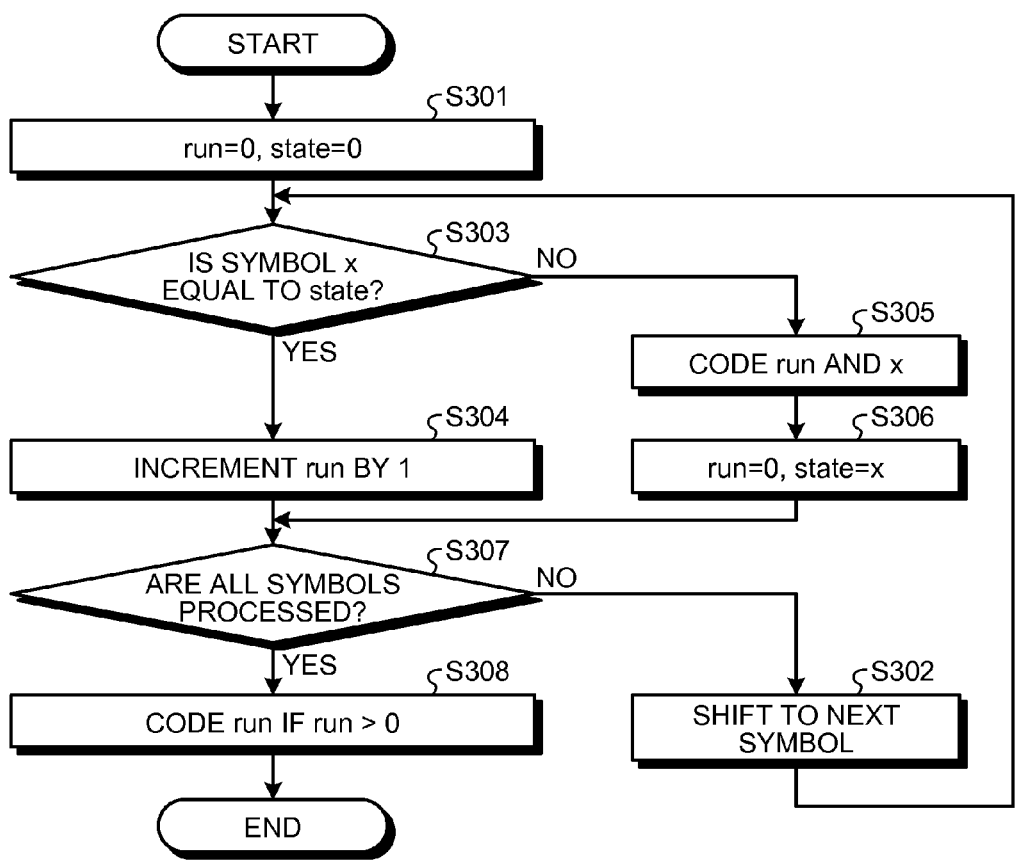
FIG. 8 is a flowchart illustrating processes of run-length encoding.

FIG. 8 is a flowchart illustrating an example of procedures of run-length encoding. Processes in the flowchart illustrated in FIG. 8 are performed by the second variable-length coding unit 124. First, the number of runs "run" and the state "state" representing the state of data are initialized by assigning "0" to both thereof (step S301). Next, in step S303, it is determined whether or not a symbol x to be coded is equal to the state "state". If it is determined that the symbol x is equal to the state "state" ("YES" in step S303), the process proceeds to step S304, where the number of runs "run" is incremented by 1. Then, the process proceeds to step S307.

On the other hand, if it is determined that the symbol x to be coded is not equal to the state "state" in step S303 ("NO" in step S303), the process proceeds to step S305. In step S305, the number of runs "run" and the symbol x are coded. Then, "0" is assigned to the number of runs "run" and the state "state" is updated with the symbol x (step S306), and the process proceeds to step S307.

In step S307, it is determined whether or not the processes of steps S303 to S306 are performed for all the symbols to be coded. If it is determined that the processes are not performed for all the symbols to be coded, the coding target is shifted to a next symbol in step S302 and the process returns to step S303.

On the other hand, if it is determined that the processes are performed for all the symbols to be coded in step S307, the process proceeds to step S308. In step S308, the number of runs "run" is coded if the number of runs "run" is larger than 0. That is, the number of runs "run" is coded when the process has been proceeded to step S308 through steps S304 to S307 described above. In this case, if the total number of symbols to be coded MAX_NUM is known, a value obtained by decrementing the number of runs "run" by 1 may be coded. Note that if the number of runs "run" is 0 in step S308, the series of processes is terminated here.

FIG. 9 illustrates examples of specific processes of the run-length encoding for each symbol position ("num") when the total number of symbols to be coded MAX_NUM is 16. In the examples of FIG. 9, a symbol to be coded with the value "0" is consecutively repeated at the symbol positions "num" of 0 to 4. Accordingly, in processing these symbols, the process proceeds to step S304 as a result of the determination in step S303, and the number of runs "run" is incremented by 1 for each of these symbols. The state "state" is not updated and the value "0" is maintained.

In addition, in the example of FIG. 9, the value of a symbol to be coded is 1 at a symbol position "num"=5. Since this value is not equal to the value of the state "state", the process proceeds to step S305 as a result of the determination in step S303, and the number of runs "run" and the value 1 of the symbol at the symbol position "num"=5 are coded. Then, "0" is assigned to the number of runs "run" and the value of the state "state" is updated with the value 1 of the symbol.

In this manner, in the run-length encoding, the number of runs "run" is incremented by 1 when the same value of symbol values to be coded appears consecutively. When a different symbol value appears, the number of runs "run" and the different symbol value are coded. In the example of FIG. 9, since a different symbol value appears at each of symbol positions "num"=8 to 11, the number of runs "run" and the symbol value are coded each time.

Note that if the frequency of appearance of symbols with the value 0 is high in the processes of the flowchart of FIG. 8 described above, the value of the state "state" may be fixed to 0. As a result, it is not necessary to code the number of runs "run" when the symbol value is 0, and thus the coding efficiency can be improved.

Next, an outline of the skip coding described above will be described. The skip coding is a coding scheme in which a series of symbols is divided into a plurality of groups, it is determined whether or not all the symbols in a group are zero, and coding is performed based on the determination result.

A specific example of the skip coding is illustrated in FIG. 10. In the example of FIG. 10, the symbol positions are grouped in four groups and it is determined whether or not all symbols are 0 in each of the groups. If all the symbols in a group are 0, information indicating that a flag "skipflag" indicating skip information is TRUE is coded. Specifically, if all the symbols in a group are 0, the symbols in the group are coded only by coding the information indicating that the flag "skipflag" is TRUE. On the other hand, if at least one of symbols in a group is not 0, the information indicating that the flag "skipflag" is FALSE is coded, and furthermore, the individual symbols in the group are coded by using a variable-length code such as a Golomb-Rice code and a run-length code.

As described above, a code smaller than 1 bit per one symbol cannot be assigned in coding by the first variable-length coding unit 123. In contrast, in coding by the second variable-length coding unit 124, a symbol string in which the same symbol (0, in particular) is repeated is coded at a time, and thus a code smaller than 1 bit per one symbol can be assigned. Accordingly, it is possible with the second variable-length coding unit 124 to increase the coding efficiency in a flat region or a region where prediction is effective of an image.

On the other hand, in coding by the second variable-length coding unit 124, the number of runs "run" needs to be coded for each symbol when the same symbol is not repeated as illustrated at the symbol positions "num"=8 to 11 in FIG. 9 described above, for example. Accordingly, the coding performance of the coding by the second variable-length coding unit 124 is lower as compared to the coding by the first variable-length coding unit 123 in a texture region where the same symbol is not repeated in a symbol string and a region where prediction is not effective. Thus, the coding by the first variable-length coding unit 123 is effective in a region where the same symbol is not repeated.

Figure 11A:
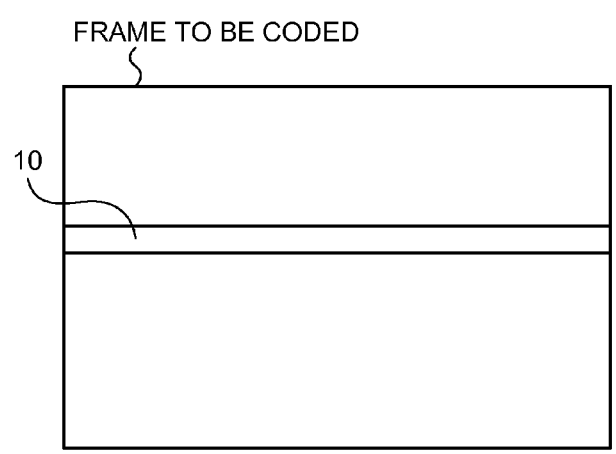
FIG. 11A is a diagram of an image block.
Figure 11B:
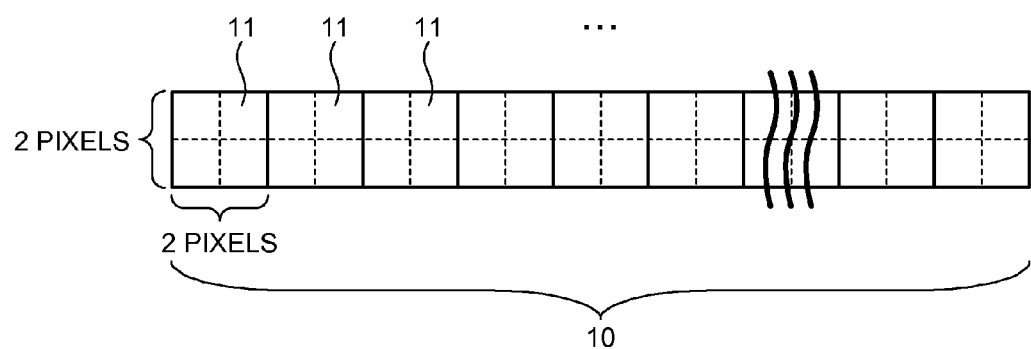
FIG. 11B is a diagram of small blocks.

Next, processes of the coefficient coding unit 110 in the entropy coder 104 that are characteristic processes in the image coding device 1 according to the present embodiment will be described in more detail. Note that in the following, the image block 10 input to the image coding device 1 is a block of two lines (see FIG. 11A). The image block 10 is divided into small blocks 11, 11, . . . having a size of 2 pixels×2 pixels by the divider 101 (see FIG. 11B). The image block 10 is a region to be coded in a frame to be coded. Each of the small image blocks 11 present in the image block 10 is a block to be coded.

Note that the size of the small image blocks 11 corresponds to the size for applying orthogonal transform at the coefficient coding unit 110. In this example in which the size of the small image block 11 is 2 pixels×2 pixels, the orthogonal transform is performed by 2×2 transform described referring to FIG. 2B.

Figure 12A:
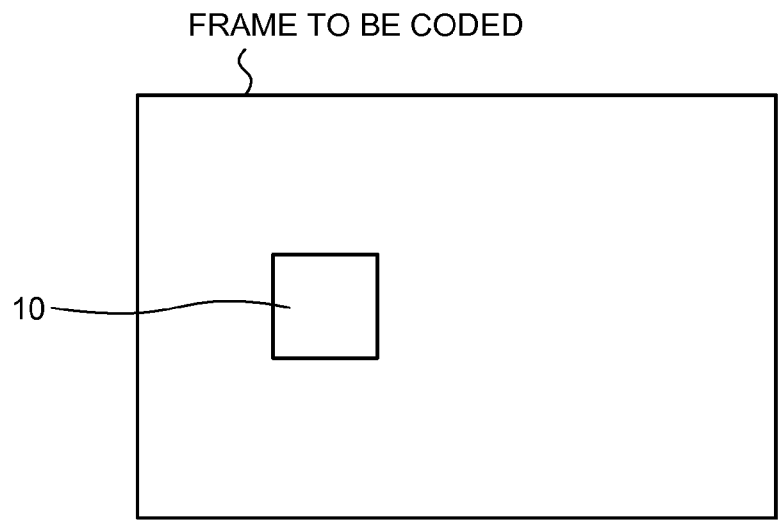
FIGS. 12A and 12B are each a diagram of another method for generating small blocks.
Figure 12B:
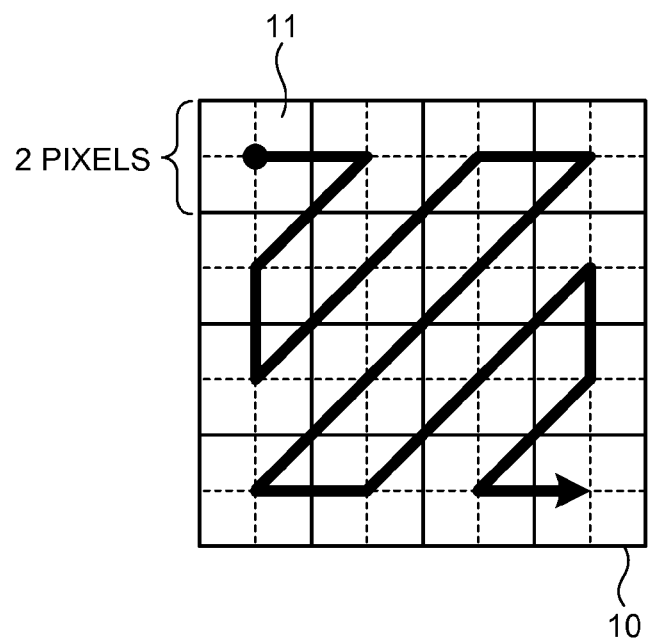

As another method for generating small blocks 11, the size of the image block 10 is assumed to be 8 pixels×8 pixels (see FIG. 12A), for example, and the size of the small pixels blocks 11 is assumed to be 2 pixels×2 pixels, for example. Then, as illustrated in FIG. 12B, pixel data of the image block 10 may be rearranged according to the size of the small blocks 11 by zigzag-scanning inside of the image block 10 with the size of the small blocks 11.

Figure 13:
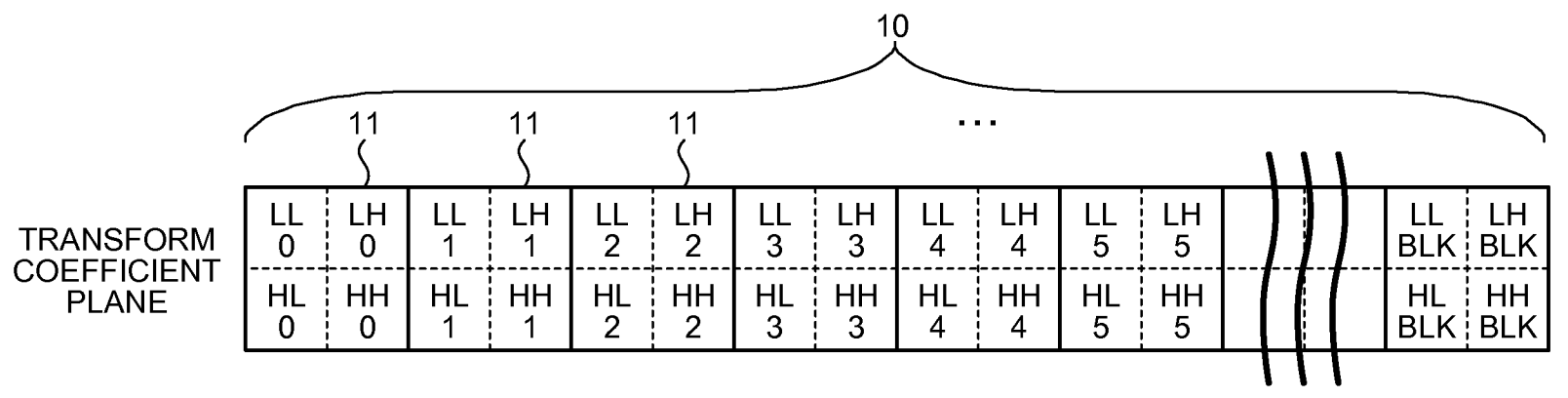

FIG. 13 illustrates an example of expressing the image block 10 of pixel data of 2 lines described above and the small image blocks 11, 11, . . . obtained by dividing the image block 10 into blocks of 2 pixels×2 pixels by using coefficient positions LL, HL, LH and HH. Note that the numerals 0, 1, . . . in FIG. 13 are numbers assigned for convenience to distinguish the small blocks 11. A value BLK represents the number of small blocks 11 in the image block 10. In the following, the coefficient positions LL, HL, LH and HH will be described as coefficient positions [pos] as appropriate. In this case, the value "pos" is one of the values LL, HL, LH and HH.

Specifically, as a result of applying 2×2 transform to a small block 11 of 2 pixels×2 pixels, a quantized transform coefficient 13 corresponding to the position LL where horizontal and vertical components are low frequency components, quantized transform coefficients 13 corresponding to the position HL and the position LH where either one of horizontal and vertical components is a low frequency component, and a quantized transform coefficient 13 corresponding to the position HH where horizontal and vertical components are high frequency components are generated.

A plane formed by arranging the transform coefficients according to the coefficient positions in the horizontal and vertical directions and the positions of the small blocks 11 on the image block 10 is referred to as a coefficient plane.

Figure 14A:
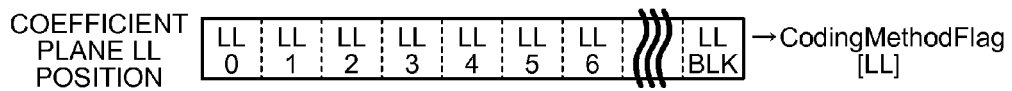
FIGS. 14A-14D are each a diagram in which transform coefficients are rearranged in groups according to positions.
Figure 14B:
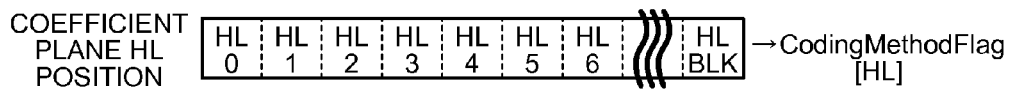
Figure 14C:
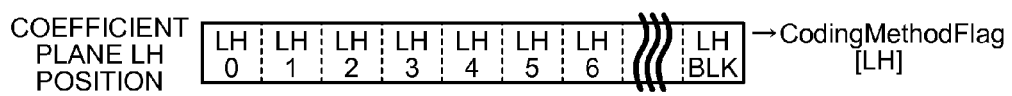
Figure 14D:
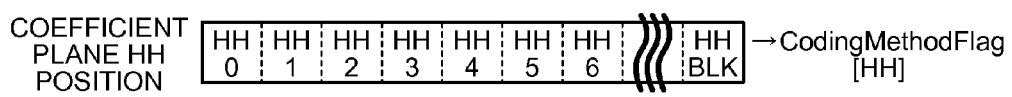

FIGS. 14A to 14D illustrate examples in which the quantized transform coefficients 13, 13, . . . on the coefficient plane illustrated in FIG. 13 are grouped by each coefficient position and rearranged in units of the image block 10. Here, 2×2 transform is applied to the small blocks 11 having the size of 2 pixels×2 pixels, and thus, each of the small blocks 11, 11, . . . is expressed by four coefficient positions LL, HL, LH and HH. FIG. 14A is an example in which the coefficients at the position LL on the coefficient plane are grouped. FIG. 14B is an example in which the coefficients at the position HL on the coefficient plane are grouped. FIG. 14C is an example in which the coefficients at the position LH on the coefficient plane are grouped. FIG. 14D is an example in which the coefficients at the position HH on the coefficient plane are grouped. Thus, each of FIGS. 14A to 14D illustrates a coefficient string in which the transform coefficients are arranged for each frequency component. Note that in FIGS. 14A to 14D, coefficients with the same number belong to the same small block 11.

In the present embodiment, the first variable-length coding by the first variable-length coding unit 123 and the second variable-length coding by the second variable-length coding unit 124 are selectively applied to the coefficient positions LL, HL, LH and HH, namely coefficient strings in which the transform coefficients are arranged for respective frequency components. The first variable-length coding of the present embodiment is a scheme for variable-length coding coefficient strings for each coefficient. The second variable-length coding of the present embodiment is a scheme for coding each variable-length partial data of 1 bit or more in the coefficient string. Which of the first variable-length coding and the second variable-length coding is to be applied to the coefficient positions LL, HL, LH and HH, namely the coefficient position [pos], is indicated by a flag CodingMethodFlag[pos]. The value pos is values LL, HL, LH and HH indicating the coefficient positions LL, HL, LH and HH, respectively. The flag CodingMethodFlag[pos] corresponds to the coding method information 30 described above.

As a more specific example, if the flag CodingMethodFlag[pos] indicates a value TRUE, the first variable-length coding is applied to the quantized transform coefficient 13 of the frequency component indicated by the value [pos]. On the other hand, if the flag CodingMethodFlag[pos] indicates a value FALSE, the second variable-length coding is applied to the quantized transform coefficient 13 of the frequency component indicated by the value [pos]. Note that values of the flag CodingMethodFlag[pos] indicating either of the first variable-length coding and the second variable-length coding are not limited to TRUE and FALSE mentioned above, and 0 and 1 may be used, for example.

Specifically, in the configuration illustrated in FIG. 5 described above, the coding method determining unit 121 controls the switching unit 122 based on the coefficient position information 20 supplied from the coefficient position extracting unit 120 and the coding method information 30 supplied from the coding control unit 130 or the like. More specifically, if the flag CodingMethodFlag[pos] corresponding to the coefficient position [pos] indicated by the coefficient position information 20 indicates the value TRUE, the coding method determining unit 121 controls the switching unit 122 to select the output terminal 122B. On the other hand, if the flag CodingMethodFlag[pos] corresponding to the coefficient position [pos] indicates the value FALSE, the coding method determining unit 121 controls the switching unit 122 to select the output terminal 122C.

When Golomb-Rice coding is applied to the first variable-length coding and run-length encoding is applied to the second variable-length coding, a coding parameter k for the Golomb-Rice coding described above is optimized for each image block 10. The optimized coding parameter best_k obtained by optimizing the coding parameter k is transmitted to the decoding side together with the coded data in which the quantized transform coefficient 13 is coded.

Figure 15:
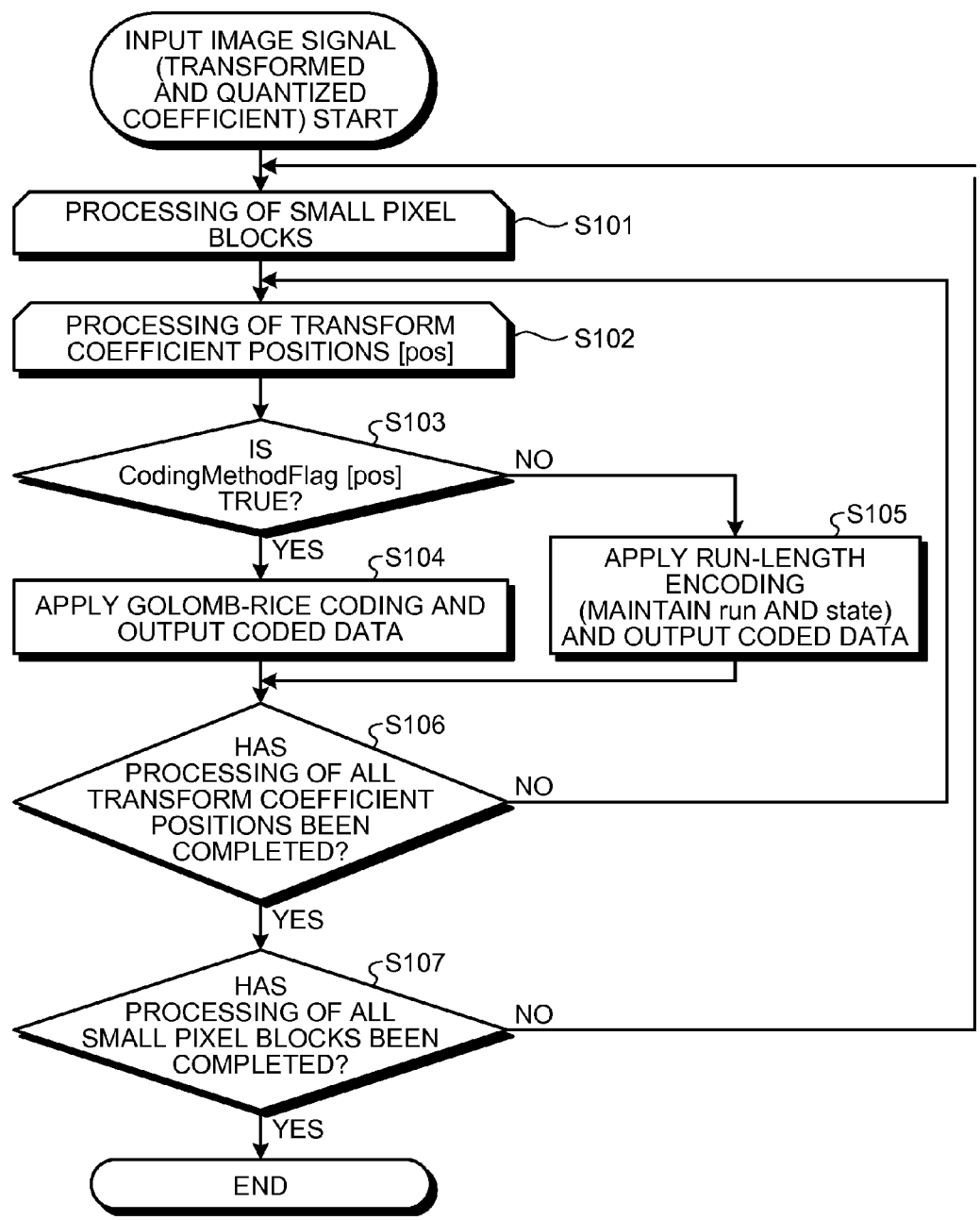
FIG. 15 is a flowchart illustrating processes in the coefficient coding unit.

FIG. 15 is a flowchart illustrating an example of processes in the coefficient coding unit 110. The processes illustrated in FIG. 15 are an example in a case where Golomb-Rice coding is used as the first variable-length coding and the coding parameter k that is a coding length in Golomb-Rice coding is determined in advance. It is assumed that run-length encoding is used as the second variable-length coding.

Note that in the following, it is assumed that the small blocks 11 are of 2 pixels×2 pixels. In addition, the coding parameter k is fixedly determined by the entropy coder 104, for example, or determined by an optimizing process, which will be described later.

First, processing of the quantized transform coefficients 13 supplied to the entropy coder 104 for each small block 11 is started (step S101). In the next step S102, processing of the small blocks 11 to be processed for each coefficient position [pos] is started.

Note that it is assumed for example that the quantized transform coefficients 13 are input to the coefficient coding unit 110 and supplied to the coefficient position extracting unit 120 in a predetermined order of the coefficient positions [pos] such as in the order of the coefficient position [LL], the coefficient position [HL], the coefficient position [LH] and the coefficient position [HH]. Alternatively, information indicating the coefficient position [pos] may be added to each of the quantized transform coefficients 13, 13, . . . . The coefficient position extracting unit 120 outputs the coefficient position information 20 indicating the coefficient position [pos] for the input quantized transform coefficient 13. The coefficient position information 20 is supplied to the coding method determining unit 121.

After the processing for each coefficient position [pos] is started, the process proceeds to step S103. In step S103, the coding method determining unit 121 obtains a coefficient position [pos] that is currently processed based on the coefficient position information 20 supplied from the coefficient position extracting unit 120. Then, the coding method determining unit 121 determines whether or not the value of the flag CodingMethodFlag[pos] obtained from the coding method information 30 corresponding to the obtained coefficient position [pos] is the value (TRUE) indicating the first variable-length coding.

If it is determined that the value of the flag CodingMethodFlag[pos] is the value indicating the first variable-length coding, the process proceeds to step S104. In step S104, the coding method determining unit 121 controls the switching unit 122 so that the output terminal 122B is selected according to the value (TRUE) of the flag CodingMethodFlag[pos]. The quantized transform coefficient 13 of the coefficient position [pos] is supplied to the first variable-length coding unit 123 through the switching unit 122, and subjected to Golomb-Rice coding according to the coding parameter k. The coded data resulting from Golomb-Rice coding the quantized transform coefficient 13 of the coefficient position [pos] are output from the coefficient coding unit 110.

On the other hand, if it is determined that the value of the flag CodingMethodFlag[pos] is not the value indicating the first variable-length coding, the process proceeds to step S105. Thus, in this case, the value of the flag CodingMethodFlag[pos] is the value (FALSE) indicating the second variable-length coding. In step S105, the coding method determining unit 121 controls the switching unit 122 so that the output terminal 122C is selected according to the value (FALSE) of the flag CodingMethodFlag[pos]. The quantized transform coefficient 13 of the coefficient position [pos] is supplied to the second variable-length coding unit 124 through the switching unit 122.

Note that although the method of optimizing the coding parameter k for the Golomb-Rice coding is described, this is not limited to the example. Specifically, the processes in the flowchart of FIG. 15 can also be applied to a case where information indicating a probability model for determining a code table in Huffman coding is used as the coding parameter k.

The second variable-length coding unit 124 applies run-length encoding to the supplied quantized transform coefficient 13 as described with reference to the flowchart of FIG. 8. In this process, if a symbol to be coded is not 0, the second variable-length coding unit 124 performs Golomb-Rice coding to the value ("value") of the symbol to be coded according to the coding parameter k.

On the other hand, if the value of the symbol to be coded is 0, the second variable-length coding unit 124 holds the number of runs "run" and the state "state" at the coefficient position [pos] are stored in the memory in association of the coefficient position [pos]. For example, if the number of runs "run" with the same state "state" at the coefficient position [pos] is stored in the memory, the number of runs "run" is incremented by 1. By holding the number of runs and the state "state" at the coefficient position [pos] in the memory in this manner, it is possible to sequentially process the small blocks 11 without holding all the symbols in the image block 10 in the memory.

The coding parameter k used in Golomb-Rice coding may be different values between the first variable-length coding and the second variable-length coding.

After the processes in step S104 or step S105 is terminated, the process proceeds to step S106. In step S106, it is determined whether or not processing for all coefficient positions [pos] in the small block 11 determined to be processed in step S101 has been completed. If it is determined that the processing has not been completed, the process returns to step S102 where processing of a next coefficient position [pos] in the small block 11 is started.

On the other hand, if it is determined in step S106 that processing for all the coefficient positions [pos] in the small block 11 to be processed has been completed, the process proceeds to step S107. In step S107, it is determined whether or not processing for all the small blocks 11 in the image block 10 in which the small block 11 determined to be processed in step S101 has been competed. If it is determined that the processing has not been completed, the process returns to step S101 where processing of a next small block 11 in the image block 10 is started.

If it is determined in step S107 that processing for all the small blocks 11 in the image block 10 has been completed, the series of processes illustrated in FIG. 15 is terminated. Then, processing for a next image block 10, for example, is started in a similar manner.

Next, an example of processes for determining the coding parameter k will be described referring to a flowchart of FIG. 16. First, when the processes for determining a coding parameter k[pos] for each coefficient position [pos] (step S110) are started, the coefficient coding unit 110 performs the processes of steps S101 to S107 in the flowchart of FIG. 15 described above to determine a generated code amount "Bits". The coefficient coding unit 110 performs the processes of steps S101 to S107 for each coding parameter k and for each coefficient position [pos] (step S111) to calculate a generated code amount "Bits[pos][k]" for each coding parameter k and for each coefficient position [pos].

Note that it is not necessary to actually output coded data in step S111, but it is only needed to calculate the generated code amount. As an example, if Golomb-Rice coding is applied, the code amount "Bits_x" for the coded symbol x can be calculated by the procedures represented by the following expression (1).

Note that the expression (1) represents calculation procedures according to the rules of the C language that is a programming language. A numeral written at the beginning of each line of the expression (1) separated by ": (colon)" is a line number for distinguishing each line. The whole of first to sixth lines constitute the expression (1).

```
1:  Bits_x = 0
2:  abs_x = abs(X)
3:  q = abs_x>>k
4:  if   (q < ESC_LEN)  Bits_x+ = q + k + 1
5:  else Bits_x+ = ESC_LEN + SYMBOL_LEN
6:  if   (abs_x! = 0)      Bits_x+ = 1           (1)
```

In the expression (1), an operator abs(X) returns an absolute value of the value X. A parameter ESC_LEN represents a boundary with an escape code. In addition, a value SYMBOL_LEN represents a bit width of a coded symbol. In the present embodiment, an escape code is applied when a variable q exceeds the value of the parameter ESC_LEN, but this is not limited to this example. For example, the value (q+k+1) may simply be a code amount "Bits_x" for a coded symbol x without applying an escape code. The code amount "Bits[pos]" for each coefficient position [pos] can be calculated by sequentially adding the code amount "Bits_x" for each coded symbol x.

After obtaining the generated code amount "Bits[pos][k]" for a certain coding parameter k and a coefficient position [pos] in step S111, the process proceeds to step S112. In step S112, the coefficient coding unit 110 determines whether or not the generated code amounts "Bits[pos][k]" for all the coding parameters k and coefficient positions [pos] are obtained. If it is determined that all the code amounts are not obtained, the process proceeds to step S110 where a generated code amount "Bits[pos][k]" for a next coding parameter k or coefficient position [pos] is obtained.

On the other hand, if it is determined in step S112 that the generated code amounts "Bits[pos][k]" for all the coding parameters k and coefficient positions [pos] are obtained, the process proceeds to step S113. In step S113, the coefficient coding unit 110 obtains a coding parameter k with which the generated code amount "Bits[pos]" is minimum for each coefficient position [pos]. The coding parameter k with which the generated code amount "Bits[pos]" is minimum at a coefficient position [pos] is referred to as an optimized coding parameter best_k[pos].

After obtaining the optimized coding parameter best_k[pos] for each coefficient position [pos], the process proceeds to step S114. In step S114, the coefficient coding unit 110 uses the optimized coding parameter best_k[pos] as the coding parameter k in Golomb-Rice coding, performs the processes in the flowchart of FIG. 15 described above, and outputs coded data in which the quantized transform coefficient 13 is coded. In addition, the coefficient coding unit 110 performs fixed-length coding on an index value of the optimized coding parameter best_k[pos] and embeds the coding result in the coded data.

As described above, in this embodiment, the first variable-length coding that is one symbol coding assigning a code per one symbol and the second variable-length coding that is multiple-symbol coding capable of assigning a code to a plurality of symbols at a time are provided as variable-length coding methods for the quantized transform coefficients 13. In addition, it is possible to select either of the first variable-length coding and the second variable-length coding for each coefficient position, namely spatial frequency, of the quantized transform coefficients 13. Accordingly, variable-length coding can be adaptively performed on the quantized transform coefficients 13 according to the properties of the spatial frequencies.

Note that, the size of the image block 10 is 2 lines in the description above, the size of the image block 10 is not limited to this example. For example, the image block 10 may be a given region obtained by delimited the two lines in the vertical direction, or may be constituted by lines in multiples of 2 such as four lines. If the size of the image block 10 is larger than four lines, the inside of the image block 10 may be zigzag-scanned in units of 2 pixels×2 pixels to obtain the small blocks 11 (see FIG. 12B).

In addition, although it is switched between two types of variable-length coding methods for each coefficient position in the description above, the methods are not limited to this example. For example, it may be switched among three or more types of variable-length coding methods. As an example, it may be switched among three types of variable-length coding methods of Golomb-Rice coding, run-length encoding and skip coding for each coefficient position.

Next, examples of syntaxes that can be applied to the coded data 14 output from the image coding unit 100 according to the present embodiment will be described referring to FIGS. 17A to 17C, 18A and 18B. Data of the coded data 14 are arranged according to the syntaxes described below. Accordingly, when a syntax table giving the syntax is provided at both the coding side and the decoding side, it is possible to appropriately decoding the coded data 14 at the decoding side.

Note that parts that are closely relevant to the subject of the present embodiment are mainly illustrated and the other parts are not illustrated so as to avoid complication in FIGS. 17A to 17C, 18A and 18B.

First, an example of a first syntax expressing an example of the structure of the coded data 14 generated by a scheme of sequentially processing the small blocks 11 in the image block 10 will be described referring to FIGS. 17A, 17B and 17C. Note that syntaxes are described according to the rules of the C language that is one of programming languages in FIGS. 17A, 17B and 17C.

According to the first syntax, the coded data 14 are composed of a header, a block and a sub-block. Header information of the coded data 14 is described in the header. The header is applied to one frame of image data or a sequence of a series of frames, for example. The block contains data forming the image block 10 in the coded data 14. The sub-block contains data forming a small block 11 in the coded data 14. Accordingly, the block includes a syntax of the sub-block.

FIG. 17A illustrates a syntax expressing an example of the structure of the header. The coding method information 30 for each coefficient position [pos], namely CodingMethodFlag[pos], is described in the syntax of the header. The coefficient position [pos] or a group number of a group into which the coefficient position [pos] is grouped is described in the value NUM_POS of the coefficient position [pos].

FIG. 17B illustrates a syntax expressing an example of the structure of the block. In the syntax illustrated in FIG. 17B, the image block 10 is divided into a number of segments "seg", the number indicated by the value NUM_SEG. In the syntax of FIG. 17B, a prediction mode "pred_mode" is described for each segment "seg". In addition, an index value CodingParamIdx[pos] indicating a coding parameter for each coefficient position [pos] is described in each segment "seg". In the index value CodingParamIdx[pos], a coding parameter k in Golomb-Rice coding, for example, is described.

Furthermore, in the syntax of the block, the sub-blocks "subblock( )" included in the respective segments "seg" are described. The value NUM_BLK indicates the number of sub-blocks included in a segment "seg". Furthermore, when the flag CodingMethodFlag[pos] is the value FALSE, the state "state[pos]" is 0 and the number of runs "run[pos]" is larger than 0 at the coefficient position [pos], the number of runs "run[pos]" is described.

Note that the number of runs "run[pos]" and the state "state[pos]" used in run-length encoding are initialized to 0 in units of an image block or in units of a segment for each coefficient position [pos].

FIG. 17C illustrates a syntax expressing an example of the structure of the sub-block. In the sub-block, the description is changed depending on the value of the flag CodingMethodFlag[pos] for each coefficient position [pos]. Specifically, if the flag CodingMethodFlag[pos] is the value TRUE, a coefficient "coef[blk][pos]" that is a quantized transform coefficient 13 coded with a Golomb-Rice code is described in association with the coefficient position [pos].

On the other hand, if the flag CodingMethodFlag[pos] is other than the value TRUE, that is the value FALSE, in the syntax of the sub-block, the description is further changed depending on whether the state "state[pos]" is different from the coefficient "coef[blk][pos]". Specifically, when the state "state[pos]" is different from the coefficient "coef[blk][pos]", the number of runs "run" and the state "state" resulting from run-length encoding are described in association with the coefficient position [pos].

Next, an example of a second syntax expressing an example of the structure of the coded data 14 generated by a scheme of coding the quantized transform coefficient 13 for each coefficient position [pos] will be described referring to FIGS. 18A and 18B. Note that syntaxes are described according to the rules of the C language that is one of programming languages in FIGS. 18A and 18B similarly to the description above.

According to the second syntax, the coded data 14 are composed of a header and a block. Header information of the coded data 14 is described in the header. The header is applied to one frame of image data or a sequence of a series of frames, for example. The block contains data forming the image block 10 in the coded data 14.

FIG. 18A illustrates a syntax expressing an example of the structure of the header. Since the header structure according to the second syntax is the same as the header structure according to the first syntax described with reference to FIG. 17A, the description thereof will not be repeated here.

FIG. 18B illustrates a syntax expressing an example of the structure of the block. The block according to the second syntax is different from the block according to the first syntax illustrated in FIG. 17B in that results of the first and second variable-length coding are directly described in the block for each small block 11. Note that the small blocks 11, 11, . . . contained in the image block 10 described by the syntax of the block will be explained as small blocks [blk] here by using a variable blk.

In the syntax of FIG. 18B, a prediction mode "pred_mode" is described for each segment seg. In addition, an index value CodingParamIdx[pos] indicating a coding parameter for each coefficient position [pos] is described in each segment "seg". In the index value CodingParamIdx[pos], a coding parameter k in Golomb-Rice coding, for example, is described.

The description for each coefficient position [pos] is changed depending on the value of the flag CodingMethodFlag[pos]. Specifically, if the flag CodingMethodFlag[pos] is the value TRUE, a coefficient "coef[blk][pos]" that is a quantized transform coefficient 13 coded with a Golomb-Rice code is described for each small block [blk] corresponding to the small block 11 in association with the coefficient position [pos] in the small block [blk].

On the other hand, if the flag CodingMethodFlag[pos] is other than the value TRUE, that is the value FALSE, the description is further changed depending on whether the state "state[pos]" is different from the coefficient "coef[blk][pos]". Specifically, when the state "state[pos]" is different from the coefficient "coef[blk][pos]", the number of runs "run" and the state "state" resulting from run-length encoding are described in association with the coefficient position [pos].

In addition, if the state "state" is 0 and the number of runs "run" is larger than 0 after processing of all the small blocks [blk] for the coefficient position [pos] is finished, the number of runs "run[pos]" is described after the description of the coefficient position [pos].

Although the flag CodingMethodFlag that is information for switching between the variable-length coding methods is contained in the header in the syntax described above, the flag is not limited to this example. That is, the flag CodingMethodFlag may be contained in the block or the sub-block. If the flag CodingMethodFlag is contained in the block, switching between the variable-length coding methods may be made for each segment. Alternatively, if the flag CodingMethodFlag is contained in the sub-block, switching between the variable-length coding methods may be made for each small block 11, 11, . . . . Similarly, the prediction mode "pred_mode" and the index value CodingParamIdx may be contained in the header or the sub-block so that the prediction mode and the coding parameter may be specified for each sequence or frame or for each small block 11, 11, . . . .

Moreover, a syntax element that is not defined in the present embodiment may be inserted between lines of the syntaxes illustrated in FIGS. 17A to 17C, 18A and 18B, or description relating to conditional branch in the syntaxes. For example, the mode information 31 is contained in the syntaxes. As described above, the mode information 31 includes information necessary for decoding other than the transform coefficient, such as prediction mode information, quantization information including parameters relating to the quantization process such as a quantization parameter (QP), a quantization step size and a quantization matrix.

Furthermore, it is also possible to divide the syntax table into a plurality of tables or integrate a plurality of separated syntax tables. Furthermore, the terms used in the syntaxes are not limited to those described above, and may be arbitrarily changed depending on the used mode.

In the present embodiment, variable-length coding of assigning a code of 1 bit or more to one symbol is applied to the first variable-length coding unit 123 and the second variable-length coding unit 124, but coding is not limited to this example. That is, variable-length coding capable of assigning a code of less than 1 bit to one symbol may be applied to each of the first variable-length coding unit 123 and the second variable-length coding unit 124. An example of such variable-length coding is CABAC (context-based adaptive binary arithmetic coding) that is a context-based adaptive binary arithmetic coding.

In this case, context (probability table) to be applied to the arithmetic coding and transition thereof are different between the first variable-length coding unit 123 and the second variable-length coding unit 124. The coding performance in arithmetic coding can be improved by applying the first variable-length coding unit 123 and the second variable-length coding unit 124 having different transition of context and switching therebetween by the switching unit 122 for each coefficient position. As an example, arithmetic coding having an appropriate probability model can be achieved by using different contexts between high frequency components where entropy is small and low frequency components where the entropy is large of the transform coefficients.

Note that although it is described above that the transformer and quantizer 103 quantized a transform coefficient resulting from orthogonal transform, but it is not limited to this example. Specifically, a transform coefficient resulting from orthogonal transform may be supplied to the entropy coder 104 and the inverse quantizer and inverse transformer 105 without being quantized. In this case, none of other processing corresponding to quantization such as inverse quantization in the inverse quantizer and inverse transformer 105 is performed.

Second Embodiment

Next, a second embodiment will be described. The second embodiment is an example in which a generated code amount per unit time in compression coding of moving image data is controlled to be a given value or lower. For example, a generated code amount generated in one frame of moving image data is controlled to be a given value or lower. Alternatively, the generated code amount may be controlled in predetermined units of one or a plurality of lines, or the generated code amount may be controlled in units of blocks into which one frame is divided.

Figure 19:
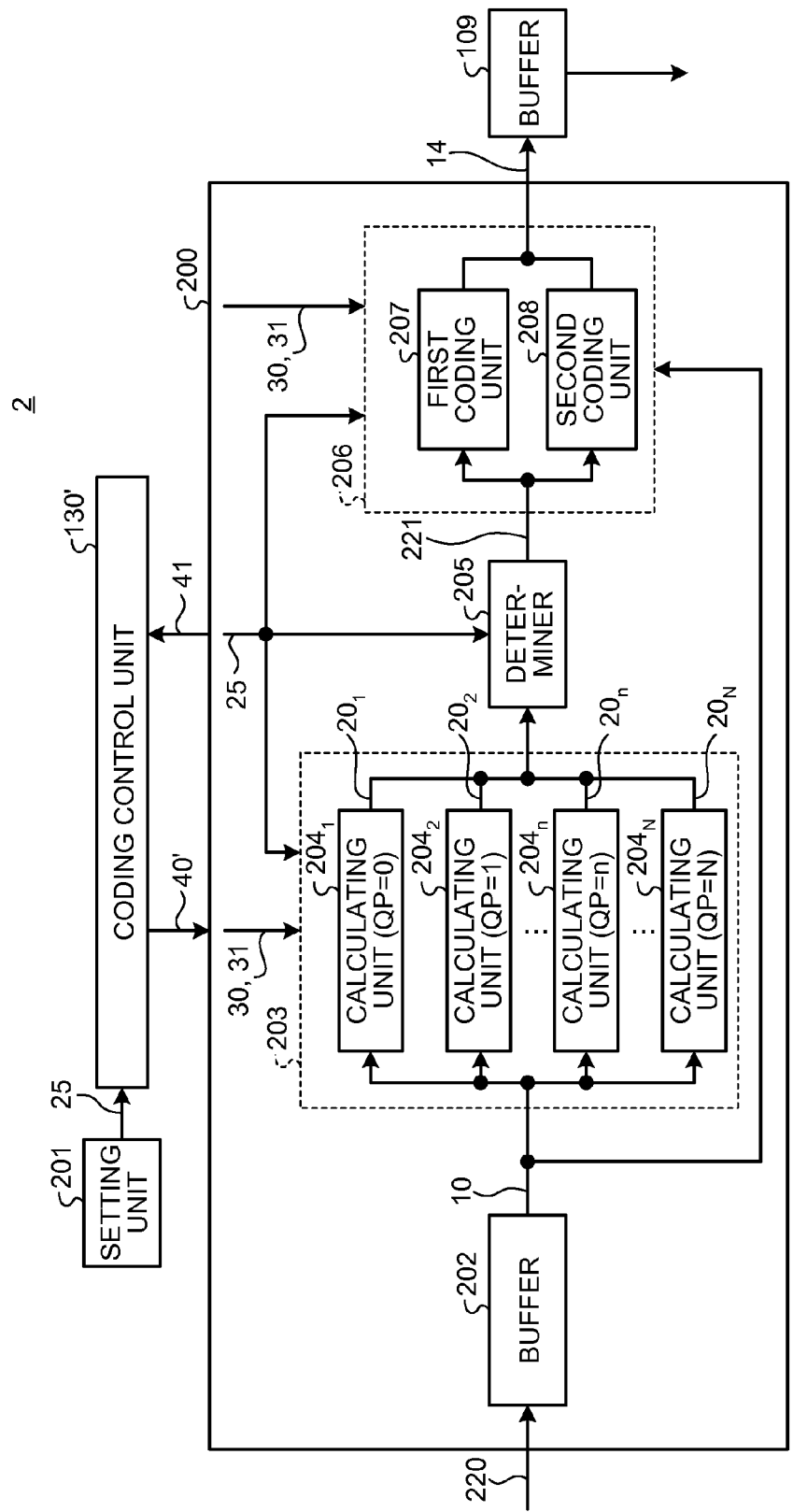
FIG. 19 is a diagram illustrating an image coding device according to a second embodiment.

FIG. 19 is a block diagram illustrating an example of a configuration of an image coding device 2 to which the second embodiment can be applied. Note that parts in FIG. 19 that are the same as those in FIG. 1 described above will be designated by the same reference numerals and detailed description thereof will not be repeated. The image coding device 2 is an example in which the image coding unit 100 described above in the first embodiment is applied to two-pass image coding.

The image coding device 2 includes an image coding unit 200, a setting unit 201, a coding control unit 130' and the buffer 109. The image coding device 2 includes a plurality of calculating units having functions equivalent to those of the image coding unit 100 according to the first embodiment, and attempts to code input moving image data 220 by using different quantization parameters $QP_1, QP_2, \ldots, QP_N$ to obtain generated code amounts therefrom. As a result, a quantized parameter $QP_n$ with which the generated code amount does not exceed that corresponding to a compression rate set in advance by the setting unit 201 out of the quantization parameters $QP_1, QP_2, \ldots, QP_N$ used by the respective calculating units is selected. The selected quantization parameter $QP_n$ is applied to the coding unit having the functions equivalent to those of the image coding unit 100 according to the first embodiment, performs coding of the moving image data 220 again and obtains output of coded data 14. The coded data 14 are temporarily accumulated in the buffer 109 and output from the image coding device 2 in units of a frame, for example.

An example of a configuration of the image coding unit 200 will be described in more detail. In FIG. 19, the image coding unit 200 includes a buffer 202, a preliminary compressor 203, a determiner 205 and a main compressor 206.

The preliminary compressor 203 includes a plurality of calculating units $204_n$ that calculate a generated coding amount with a given quantization parameter $QP_n$. The calculating units $204_n$ have functions equivalent to those of the image coding unit 100 according to the first embodiment described above. Specifically, the calculating units $204_n$ each have the divider 101, the subtractor 102, the transformer and quantizer 103, the entropy coder 104, the inverse quantizer and inverse transformer 105, the adder 106, the memory 107 and the predictor 108.

The calculating units $204_n$ each obtain a prediction error signal 12 for a predicted image signal 19 of small blocks 11 into which an input image block 10 is divided, orthogonally transform the prediction error signal 12, and quantize the obtained transform coefficient with a predetermined quantization parameter $QP_n$. The calculating units $204_n$ then obtain a generated code amount when a quantized transform coefficient 13 resulting from quantizing the transform coefficient is variable-length coded by the entropy coder 104.

In the image coding unit 200, different quantization parameters $QP_1, QP_2, \ldots, QP_N$ are applied to parts of the calculating units $204_1, 204_2, \ldots, 204_N$ corresponding to the transformer and quantizer 103 and the inverse quantizer and inverse transformer 105 in the image coding unit 100, respectively.

The main compressor 206 includes a first coding unit 207 having a fixed generated code amount. The first coding unit 207 codes each pixel at a fixed code length, for example. Coding at a fixed code length is not limited to be performed in units of a pixel, and may be performed in units of a predetermined number of pixels, in units of a small block 11, in units of an image block 10, or the like.

The main compressor 206 further includes a second coding unit 208 having functions equivalent to those of the image coding unit 100 according to the first embodiment described above. Specifically, the second coding unit 208 performs coding by using a variable-length code. Since the configuration and the operation of the second coding unit 208 are not different from those of the image coding unit 100 described above, description thereof will not be repeated here.

Compression rate information 25 indicating the compression rate set by the setting unit 201 is supplied to the coding control unit 130'. The coding control unit 130' supplies coding control information 40' for controlling overall coding processes performed by the image coding device 2 to the image coding unit 200, similarly to the coding control unit 130 according to the first embodiment described above.

The coding control information 40' includes coding method information 30, mode information 31 such as prediction mode information and parameters relating to quantization, and also the compression rate information 25. The coding method information 30 and the mode information 31 are supplied to the preliminary compressor 203 and the main compressor 206, respectively. In addition, the compression rate information 25 is supplied to the preliminary compressor 203, the main compressor 206 and the determiner 205.

The input moving image data 220 are temporarily stored in the buffer 202. The moving image data 220 are divided into image blocks 10 of a predetermined size when read from the buffer 202. The image blocks 10 are obtained by dividing one frame of the moving image data, and the smallest unit thereof is a pixel while the largest unit thereof is the whole of one frame.

Note that the input moving image data 220 are in units that guarantees a predetermined compression rate in the image coding device 2, and are a concept including data of one or a plurality of lines and an image block of a predetermined size in addition to image data in units of a frame. In addition, although the image block 10 is described as being a unit for switching the coding parameter k in the first embodiment described above, it is not limited to this example and the image block 10 may have the same size as the input moving image data 220, for example.

The image block 10 read out from the buffer 202 is input to the preliminary compressor 203 for evaluation and supplied to the calculating units $204_1, 204_2, \ldots, 204_N$ in the preliminary compressor 203.

Note that the quantization parameters $QP_1, QP_2, \ldots, QP_N$ that are different from one another are applied to these calculating units $204_1, 204_2, \ldots, 204_N$, respectively, as described above. The transformer and quantizer (not illustrated) in the calculating unit $204_n$ orthogonally transforms a predicted error that is a difference between the data of the input image block 10 and predicted data, and quantizes the obtained transform coefficient with a quantization step size associated with the quantization parameter $QP_n$ similarly to the transformer and quantizer 103 described with reference to FIG. 1.

Figures 20, 21:
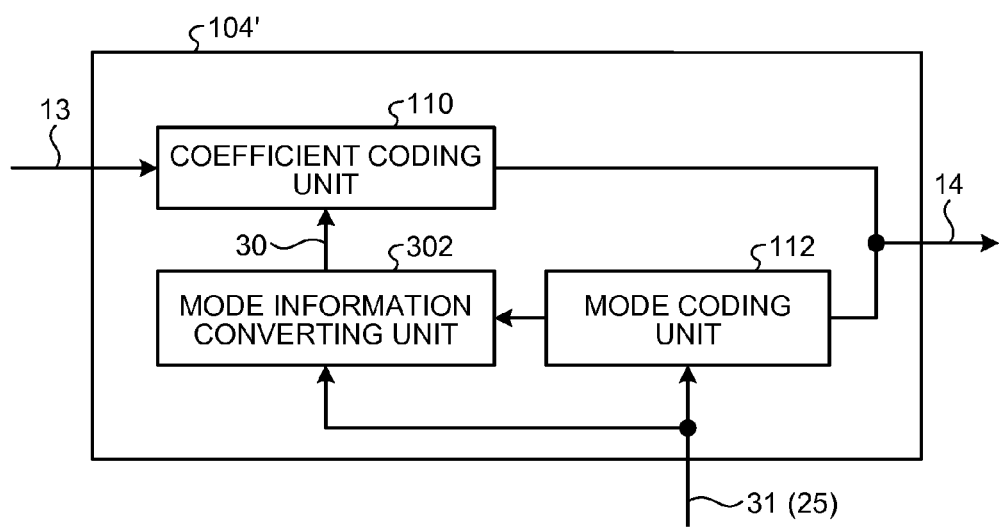
FIG. 20 is a table illustrating $QP_n$ and a quantization step size.
FIG. 21 is a diagram illustrating an entropy coder according to a third embodiment.

FIG. 20 illustrates an example of relationship between the quantization parameters $QP_n$ and the quantization step size. In this example, the value of the quantization step size is set to have a larger interval as the value of the quantization parameter $QP_n$ is larger. In this case, quantization is performed more precisely as the quantization parameter $QP_n$ is smaller, and quantization is performed more coarsely as the quantization parameter $QP_n$ is larger.

The calculating units $204_1, 204_2, \ldots, 204_N$ code the supplied image block 10 by using the applied quantization parameters $QP_n$, respectively, and calculates code amounts $20_1, 20_2, \ldots, 20_N$, respectively. Note that the calculating units $204_1, 204_2, \ldots, 204_N$ need not output coded data.

The code amounts $20_1, 20_2, \ldots, 20_N$ calculated by the calculating units $204_1, 204_2, \ldots, 204_N$, respectively, are supplied to the determiner 205. The determiner 205 evaluates these code amounts $20_1, 20_2, \ldots, 20_N$, and determines whether or not a code amount $20m$ that does not exceed a target code amount corresponding to the compression rate information 25 is present. Then, the determiner 205 generates compressing method information 221 for selecting between fixed-length coding and variable-length coding the image block 10 depending on the determination result. Note that the target code amount is a coding amount (average assigned code amount) when the code amount is equally assigned to the image blocks 10 in the input moving image data 220, for example.

If the determiner 205 determines that all of the code amounts $20_1, 20_2, \ldots, 20_N$ exceed the target code amount, the determiner 205 selects a first coding mode in which the image block 10 is fixed-length coded. The determiner 205 outputs the compressing method information 221 indicating that the first coding mode is selected. The compressing method information 221 is supplied to the main compressor 206.

The main compressor 206 reads out the image block 10 used for evaluation from the buffer 202 and inputs the read image block 10 to the first coding unit 207 according to the compressing method information 221 output from the determiner 205. The first coding unit 207 performs the first coding of fixed-length coding the image block 10 by applying linear quantization through rounding off a lower bit or spatial sampling to the image block 10, for example, Thus, if the first coding mode is selected for all of the image blocks 10, 10, . . . in one frame, the frame of the input moving image data 220 is guaranteed to be compressed to a predetermined data size or smaller. The coded data 14 resulting from coding the image block 10 by the first coding unit 207 are output from the main compressor 206 and stored temporarily in the buffer 109.

On the other hand, if a quantization parameter $QP_m$ with which the code amount $20_n$ does not exceed the target code amount is present, the determiner 205 selects a second coding mode in which the image block 10 is variable-length coded. The determiner 205 outputs the compressing method information 221 indicating that the second coding mode is selected. The compressing method information 221 is input to the main compressor 206 together with information indicating the quantization parameter $QP_m$.

The main compressor 206 reads out the image block 10 used for evaluation from the buffer 202 and inputs the read image block 10 to the second coding unit 208 according to the compressing method information 221 output from the determiner 205. The second coding unit 208 has functions equivalent to those of the image coding unit 100 illustrated in FIG. 1 as described above. The second coding unit 208 performs orthogonal transform, quantization and entropy coding of the image block 10 by the method according to the first embodiment described above. The quantization parameter $QP_n$ supplied from the determiner 205 is used for quantization. The coded data 14 resulting from coding the image block 10 by the second coding unit 208 are output from the main compressor 206 and stored temporarily in the buffer 109.

Note that the quantization parameter $QP_n$ is different for each image block 10 in the second embodiment. The quantization parameter $QP_n$ for each image block 10 is contained in the mode information 31, for example, and transmitted to the decoding side. In addition, the compressing method information 221 is also contained in the mode information 31 and embedded in the coded data 14, for example. Target code amount information representing the compression rate information 25 may further contained in the mode information 31 and embedded to the coded data 14.

As described above, the coding method according to the first embodiment described above can also be applied to two-pass image coding. Accordingly, since the coding efficiency in two-pass image coding can be increased, it is possible to improve the image quality under the condition that the generated code amount per unit time is controlled to be a given value or lower.

Third Embodiment

Next, a third embodiment will be described. In the first and second embodiments described above, the coding method for each transform coefficient position of the quantized transform coefficient 13 in entropy coding is controlled by using the coding method information 30. In contrast, the coding method for each transform coefficient position of the quantized transform coefficient 13 in entropy coding is controlled by using another parameter for controlling coding.

FIG. 21 is a block diagram illustrating an example of a configuration of an entropy coder 104' that can be applied to the present embodiment. The entropy coder 104' corresponds to the entropy coder 104 in the first and second embodiments. Note that parts in FIG. 21 that are the same as those in FIG. 4 described above will be designated by the same reference numerals and detailed description thereof will not be repeated.

The entropy coder 104' illustrated in FIG. 21 includes the coefficient coding unit 110, a mode information converting unit 302 and the mode coding unit 112. The mode information 31 containing prediction mode information and parameters relating to quantization is supplied to the mode information converting unit 302 and the mode coding unit 112. When the entropy coder 104' is applied to the image coding unit 200 according to the second embodiment described above, the compression rate information 25 is further supplied to the mode information converting unit 302 and mode coding unit 112.

The mode information converting unit 302 generates the coding method information 30 based on the supplied QP information, mode information 31 and compression rate information 25, and supplies the generated coding method information 30 to the coefficient coding unit 110. The coefficient coding unit 110 performs coding of the quantized transform coefficient 13 by switching the variable-length coding method for each coefficient position based on the coding method information 30 similarly to the first and second embodiments described above.

Operations of the mode information converting unit 302 in the present embodiment will be described in more detail. As described above, the first variable-length coding unit 123 in the coefficient coding unit 110 performs coding one symbol at a time, and the second variable-length coding unit 124 can code a plurality of symbols at a time. Therefore, the first variable-length coding unit 123 is suitable for coding data of a region or a block where low compression rate or high image quality is required. On the other hand, the second variable-length coding unit 124 is suitable for coding data of a region or a block where high compression rate or low to medium image quality is required. For example, it can be considered to divide frequency components into low frequency components and high frequency components, apply the first variable-length coding to coefficients of the low frequency components and the second variable-length coding to the high frequency components. The range of coefficient positions to which the first variable-length coding is applied can be changed by changing the range of the "low frequency components" and the range of the "high frequency components".

In the present embodiment, the flag CodingMethodFlag for specifying the variable-length coding method for each coefficient position is set by the following four types of parameters:

(1) quantization parameter QP;
(2) target code amount;
(3) prediction direction;
(4) image signal components.

Note that in the following, it is assumed that the small blocks 11 are of 2 pixels×2 pixels and 2×2 transform is employed for orthogonal transform. Accordingly, the coefficient positions [pos] are expressed as positions LL, HL, LH and HH.

First, a method of setting the flag CodingMethodFlag by using (1) the quantization parameter QP will be described. The quantization parameter QP and the target code amount are parameters closely related to the compression rate of the image data and the image quality after decoding. Accordingly, the flag CodingMethodFlag for specifying the variable-length coding method can be set by using information on the quantization parameter QP and the target code amount in a region to be coded.

FIG. 22A illustrates an example of setting the flag CodingMethodFlag[pos] at each coefficient position [pos] with respect to the quantization parameter $QP_n$. Note that the quantization parameter $QP_n$ is defined such that the interval between the quantization step sizes becomes larger as the value of the quantization parameter $QP_n$ becomes larger as illustrated in FIG. 20.

In a region where the value of the quantization parameter $QP_n$ is small with low compression rate and high image quality, the flag CodingMethodFlag[pos] is set to the value TRUE, that is, the first variable-length coding unit 123 is to be selected from a coefficient position [pos] corresponding to a low spatial frequency to that corresponding to a higher spatial frequency. Subsequently, the flags CodingMethodFlag at coefficient positions [pos] are set so that the proportion of the value FALSE increases starting from a coefficient position [pos] corresponding to high spatial frequency as the value of the quantization parameter $QP_n$ becomes larger. In this manner, the coding efficiency can be increased by applying a suitable variable-length coding method according to the quantization parameter $QP_n$.

In the example of FIG. 22A, when the quantization parameter is QP=0 and QP=1 where the quantization is performed more precisely with low compression rate and high image quality, the flag CodingMethodFlag is set to the value TRUE at all the coefficient positions [pos], and the first variable-length coding unit 123 is applied. When the quantization parameter is QP=2 to QP=4, the flag CodingMethodFlag is set to the value FALSE at the position HH that is a coefficient position [pos] of only high frequency components so that the second variable-length coding unit 124 is applied, and the flag CodingMethodFlag is set to the value TRUE at the other coefficient positions [pos] so that the first variable-length coding unit 123 is applied.

When the quantization parameter is QP=5 to QP=7, the flag CodingMethodFlag is set to the value TRUE at the position LL that is a coefficient position [pos] of only low frequency components so that the first variable-length coding unit 123 is applied, and the flag CodingMethodFlag is set to the value FALSE at the other coefficient positions [pos] so that the second variable-length coding unit 124 is applied. In addition, when the quantization parameter is QP=8 or larger where the step size is larger, the flag CodingMethodFlag is set to the value FALSE at all the coefficient positions [pos] so that the second variable-length coding unit 124 is applied.

Next, a method of setting the flag CodingMethodFlag by using (2) the target code amount will be described. FIG. 22B illustrates an example of setting the flag CodingMethodFlag[pos] at each coefficient position [pos] with respect to the target code amount, namely the compression rate. The image quality is expected to be higher as the compression rate is lower, and the generated code amount per unit time is expected to be smaller as the compression rate is higher. Accordingly, in a range where the compression rate is low, the flag CodingMethodFlag[pos] is set to the value TRUE from a coefficient position [pos] corresponding to a low spatial frequency to that corresponding to a higher spatial frequency. Subsequently, the flags CodingMethodFlag at coefficient positions [pos] are set so that the proportion of the value FALSE increases starting from a coefficient position [pos] corresponding to high spatial frequency as the compression rate becomes higher. In this manner, the coding efficiency can be increased by applying a suitable variable-length coding method according to the compression rate.

In the example of FIG. 22B, when the compression rate is the lowest (1 to ½), the flag CodingMethodFlag is set to the value TRUE at all the coefficient positions [pos], and the first variable-length coding unit 123 is applied. When the compression rate is ½ to ¼, the flag CodingMethodFlag is set to the value FALSE at the position HH that is a coefficient position [pos] of only high frequency components so that the second variable-length coding unit 124 is applied, and the flag CodingMethodFlag is set to the value TRUE at the other coefficient positions [pos] so that the first variable-length coding unit 123 is applied.

At a higher compression rate of ¼ to ⅙, the flag CodingMethodFlag is set to the value TRUE at the position LL that is a coefficient position [pos] of only low frequency components so that the first variable-length coding unit 123 is applied, and the flag CodingMethodFlag is set to the value FALSE at the other coefficient positions [pos] so that the second variable-length coding unit 124 is applied. In addition, when the compression rate is higher than ⅙, the flag CodingMethodFlag is set to the value FALSE at all the coefficient positions [pos], and the second variable-length coding unit 124 is applied.

For example, in the second embodiment described above, the flag CodingMethodFlag for each coefficient position can be set according to the compression rate set by the setting unit 201. In the second coding unit 208, which of the first variable-length coding and the second variable-length coding is employed to code the coefficients is switched by the flag CodingMethodFlag for each coefficient position according to the compression rate.

Next, a method of setting the flag CodingMethodFlag by using (3) prediction direction will be described. Specifically, the flag CodingMethodFlag is set according to the prediction direction of a prediction mode applied to the image block 10 in the predictor 108 of the image coding unit 100 or the predictor 108 of each of the calculating units $204_1$, $204_2, \ldots, 204_N$ in the image coding unit 200.

For example, as illustrated in FIG. 3B described above, when the prediction direction is the vertical direction, the correlation in the vertical direction of the image blocks 10 is eliminated while the correlation in the horizontal direction thereof is not eliminated. Accordingly, when the prediction error signal 12 obtained using the vertical direction as the prediction direction is subjected to orthogonal transform, the transform coefficient of the vertical direction component is expected to be small and the transform coefficient of the horizontal direction is expected to be large.

Thus, in the case of the prediction mode where the prediction direction is the vertical direction, the flag CodingMethodFlag at the coefficient position LH is set to the value TRUE so that the first variable-length coding unit 123 is applied, and the flag CodingMethodFlag at the coefficient position HL is set to the value FALSE so that the second variable-length coding unit 124 is applied.

In addition, in the case of the prediction mode where the prediction direction is the horizontal direction illustrated in FIG. 3A described above, the flag CodingMethodFlag at the coefficient position HL is set to the value TRUE so that the first variable-length coding unit 123 is applied, and the flag CodingMethodFlag at the coefficient position LH is set to the value FALSE so that the second variable-length coding unit 124 is applied from similar viewpoint.

In the case of the prediction modes with the other prediction directions, only the flag CodingMethodFlag at the coefficient position LL is set to the value TRUE and the flags CodingMethodFlag at the other coefficient positions are set to the value FALSE, for example. In this manner, the coding efficiency can be increased by applying a suitable variable-length coding method according to the prediction direction.

FIG. 22C illustrates an example of setting the flag CodingMethodFlag[pos] at each coefficient position [pos] with respect to the prediction direction set in this manner. In the example of FIG. 22C, the setting according to the prediction direction is applied in a manner limited to the compression rate of ¼ to ⅙.

Next, a method of setting the flag CodingMethodFlag by using (4) the image signal components will be described. In (1) to (3) described above, the setting of the flag CodingMethodFlag[pos] for each coefficient position [pos] is set based on other parameters for controlling coding. This is not limited to this example, and the flag CodingMethodFlag[pos] may be set according to image signal components.

When an image signal is composed of a luminance component Y and chrominance components U, V, the amount of information is typically concentrated in the luminance component Y and the chrominance components U, V have smaller information amounts than the luminance component Y. Accordingly, the chrominance components UV are easier to predict and the prediction error is often smaller as compared to the luminance component Y. Therefore, the transform coefficients obtained by orthogonally transforming the chrominance components U, V are more likely to have lower entropy and symbols are more likely to be zero. Accordingly, the coding efficiency can be increased by setting the proportion of applying the second variable-length coding unit 124 to the chrominance components U, V to be higher than the proportion of applying the second variable-length coding unit 124 to the luminance component Y.

FIG. 22D illustrates an example of setting the flag CodingMethodFlag[pos] at each coefficient position [pos] with respect to the image signal components. In the example of FIG. 22D, the setting of the flag CodingMethodFlag[pos] at each coefficient position [pos] with respect to the luminance component Y and the chrominance components U, V is changed depending on the compression rate.

Specifically, when the compression rate is low (1 to ½), the flag CodingMethodFlag is set to the value FALSE at the position HH that is a coefficient position [pos] of only high frequency components so that the second variable-length coding unit 124 is applied. In addition, the flag CodingMethodFlag is set to the value TRUE with respect to the chrominance components at the other coefficient positions [pos] so that the first variable-length coding unit 123 is applied. Subsequently, the proportion of setting the flags CodingMethodFlag to the value FALSE with respect to the chrominance components U, V is increased as the compression rate is higher. In the example of FIG. 22C, at a compression rate of ½ to ¼, the flag CodingMethodFlag is set to the value TRUE at the position LL that is a coefficient position [pos] of only low frequency components with respect to the chrominance components U, V, and the first variable-length coding unit 123 is applied.

Similar method is used for the luminance component Y. In the case of the luminance component Y, since the amount of information tends to be larger than the chrominance components U, V as described above, the proportion of setting the flag CodingMethodFlag to the value TRUE and the first variable-length coding unit 123 is applied is larger than in the case of the chrominance components U, V.

When the present embodiment is applied and the flag CodingMethodFlag is set by using the quantization parameter QP or the prediction mode, information indicating such quantization parameter QP or prediction mode is transmitted to the decoding side in the mode information 31 as information necessary for decoding. Accordingly, it is possible to know at the decoding side which of the first and second variable-length codings is used for variable-length coding of the quantized transform coefficient 13 at the coding even without using the flag CodingMethodFlag. Therefore, with the configuration of the present embodiment, the flag CodingMethodFlag need not be transmitted to the decoding side, the coding method coding unit 111 in the first and second embodiments described above is unnecessary, and the additional information can be reduced while maintaining the coding efficiency. The same is applicable to the case where the flag CodingMethodFlag is set by using the image signal components.

Note that when the flag CodingMethodFlag is set by using the compression rate as in the examples of FIGS. 22B and 22D, it is necessary to separately transmit information indicating the target code amount to the decoding side. For example, it can be considered to contain the information (compression rate information) indicating the target code amount in the mode information 31, code the mode information 31 and embed the coded mode information 31 in the coded data 14.

Although 2×2 transform is used as an example in the description above, the third embodiment can obviously be applied to orthogonal transform of a larger size such as 4×4 transform. In this case, in the example where the flag CodingMethodFlag is set according to the prediction direction, a diagonal direction can further be used as the prediction direction in addition to the horizontal and vertical directions.

Moreover, the flag CodingMethodFlag can also be set by appropriately combining the quantization parameter QP, the target code amount, the predicting method and the image signal components. Furthermore, the method for setting the flag CodingMethodFlag according to the third embodiment may be applied to some of the coefficient positions, and the flag CodingMethodFlag at the other coefficient positions may be set by using PSNR (peak signal-to-noise ratio), the generated code amount, or RDO (rate distortion optimisation).

Furthermore, according to the present embodiment, the coding method coding unit 111 is not used, and the flag CodingMethodFlag need not necessarily be coded. Therefore, the description of "CodingMethodFlag[pos]" in FIGS. 17A and 18A described above is eliminated in the syntax structure. In this case, condition determination by means of the flag CodingMethodFlag[pos] in FIGS. 17B, 17C and 18B is replaced by determination under conditions for setting the flag CodingMethodFlag[pos] described with reference to FIGS. 22A to 22D.

Fourth Embodiment

Next, a fourth embodiment will be described. The fourth embodiment is directed to an example of an image decoding device associated with the image coding device 1 according to the first embodiment described above.

Figure 23A:
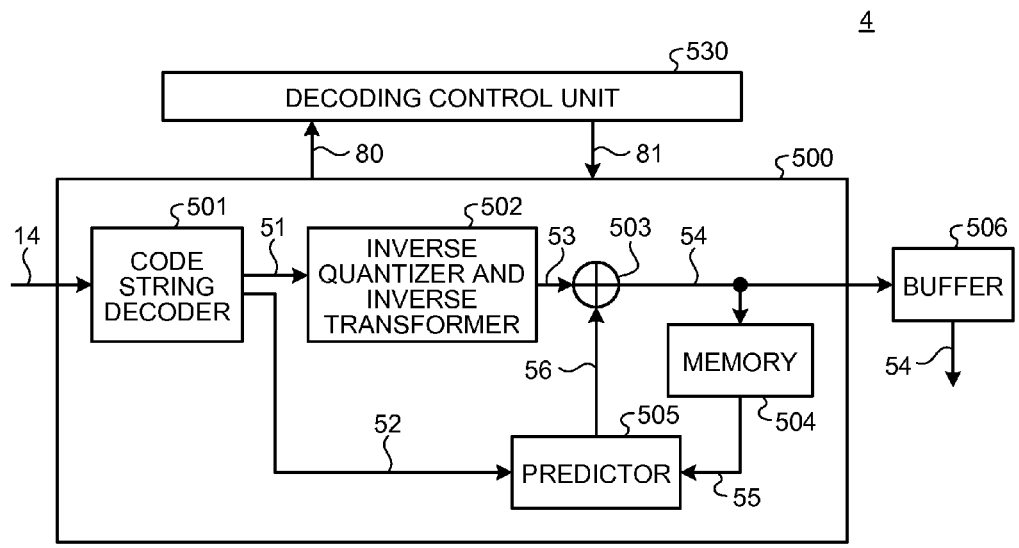
FIG. 23A is a diagram illustrating an image decoding device according to a fourth embodiment.

FIG. 23A is a block diagram illustrating an example of a configuration of an image decoding device 4 that can be applied to the fourth embodiment. The image decoding device 4 includes an image decoding unit 500, a decoding control unit 530 and a buffer 506. Decoding information 80 such as various parameter information that is supplied and feedback information output based on a result of decoding or the like is supplied to the decoding control unit 530 from the image decoding unit 500. In addition, the decoding control unit 530 generates decoding control information 81 for controlling overall decoding processes performed by the image decoding device 4, and supplies the generated decoding control information 81 to the image decoding unit 500.

The image decoding device 4 has the syntax table giving the syntaxes described with reference to FIGS. 17A to 17C or FIGS. 18A and 18B, extracts each code from the coded data 14 output from the image coding device 1 based on the syntax table and decodes the extracted code by the image decoding unit 500, and outputs decoded image data 54.

In the following, it is assumed that coding has been performed by using the image coding device 1, and sequentially processing the small blocks 11 in the image block 10 according to the syntax table giving the syntaxes illustrated in FIGS. 17A to 17C.

The image decoding unit 500 includes a code string decoder 501, an inverse quantizer and inverse transformer 502, an adder 503, a memory 504, and a predictor 505. The coded data 14 input to the image decoding unit 500 are supplied to the code string decoder 501. The code string decoder 501 decodes a code string of the coded data 14 based on the syntax table. As a result, the code string decoder 501 extracts coding parameters such as the flag CodingMethodFlag[pos] (see FIG. 17A), the prediction mode "pred_mode" and the index value CodingParamIdx[pos] (see FIG. 17B for both) from the coded data 14.

Similarly, the code string decoder 501 extracts quantization parameter information containing information necessary for quantization such as the quantization parameter QP and the quantization matrix from the coded data 14. The quantization parameter information is contained in the mode information 31 and embedded in the coded data 14, for example. The quantization parameter is supplied to the decoding control unit 530 and held in the decoding control unit 530.

In addition, the code string decoder 501 extracts a code string resulting from entropy coding the quantized transform coefficient 13 from the coded data 14. The code string decoder 501 decodes the code string in units of the image block 10 based on the coding parameter extracted from the coded data 14 to obtain a restored quantized transform coefficient 51 that is a restored version of the quantized transform coefficient 13 at each coefficient position for each small block 11. The restored quantized transform coefficient 51 is supplied to the inverse quantizer and inverse transformer 502. In addition, the prediction mode "pred_mode" extracted from the coded data 14 is supplied as prediction mode information 52 to the predictor 505.

The inverse quantizer and inverse transformer 502 loads the quantization parameter from the decoding control unit 530 and performs inverse quantization on the restored quantized transform coefficient 51 based on the loaded quantization parameter to obtain a restored transform coefficient that is a restored version of the transform coefficient of orthogonal transform. The inverse quantizer and inverse transformer 502 further performs inverse orthogonal transform associated corresponding to the orthogonal transform performed in the image coding device 1 on the restored transform coefficient to obtain a restored prediction error signal 53 that is a restored version of the prediction error signal 12.

The restored prediction error signal 53 is supplied to the adder 503, and added to a predicted image signal 56 output from the predictor 505 to generate a decoded small block 54. The decoded small block 54 is output from the image decoding unit 500, stored in the buffer 506, and also stored in the memory 504. The decoded small block 54 stored in the memory 504 is used as a reference image signal 55 for prediction of a small block to be decoded afterwards. The decoded small block 54 stored in the buffer 506 is output in units of a frame, for example, according to timing control by the decoding control unit 530.

Figure 23B:
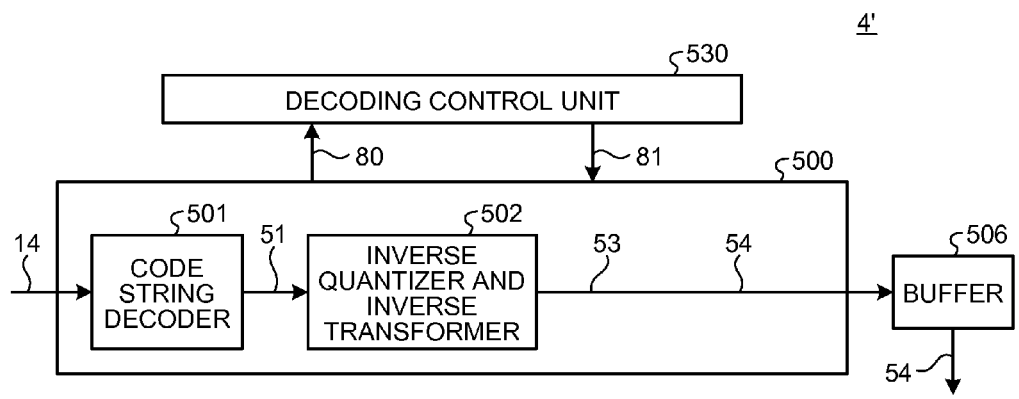
FIG. 23B is a diagram illustrating another image decoding device according to the fourth embodiment.

The decoded small block 54 stored in the memory 504 is supplied to the predictor 505 as the reference image signal 55. The predictor 505 generates the predicted image signal 56 from the reference image signal 55 based on the prediction mode information 52 similarly to the predictor 108 described above. The predicted image signal 56 is supplied to the adder 503. Note that when the coded data 14 generated without performing prediction as with the image coding device 1' illustrated in FIG. 1B described above, the predictor 505 can be eliminated from the image decoding device 4 as illustrated as an image decoding device 4' in FIG. 23B. In this case, prediction is not performed and the restored prediction error signal 53 output from the inverse quantizer and inverse transformer 502 becomes the decoded small block 54 without any change. Moreover, in this case, the other components relating to prediction, that is, the adder 503 and the memory 504 are unnecessary.

Figure 24:
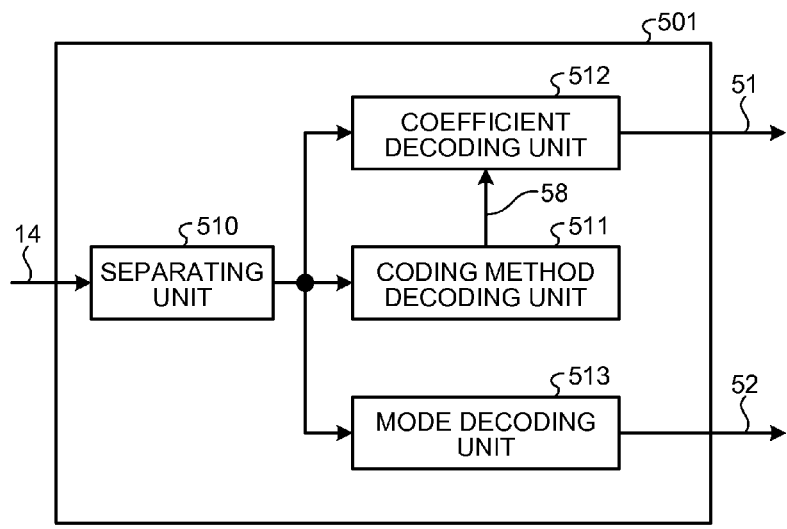
FIG. 24 is a diagram illustrating a code string decoder according to the fourth embodiment.

FIG. 24 is a block diagram illustrating an example of a configuration of the code string decoder 501. The code string decoder 501 includes a separating unit 510, a coding method decoding unit 511, a coefficient decoding unit 512 and a mode decoding unit 513. The coded data 14 are supplied to the separating unit 510. The separating unit 510 separates a code part resulting from coding the coding method information 30 and a code part resulting from coding the mode information 31 from the supplied coded data 14, and supplies the separated code parts to the coding method decoding unit 511 and the mode decoding unit 513, respectively.

In addition, the separating unit 510 separates a code part resulting from coding the quantized transform coefficient 13 from the coded data 14, and supplies the separated code part to the coefficient decoding unit 512. Alternatively, the separating unit 510 may supply the coded data 14 to the coefficient decoding unit 512.

The coding method decoding unit 511 decodes the supplied code to obtain the coding method information 30 (the flag CodingMethodFlag[pos]). The coding method information 30 is output as decoding method information 58 indicating a decoding method for decoding the coded quantized transform coefficient 13, and supplied to the coefficient decoding unit 512.

The coefficient decoding unit 512 decodes the coded data 14 supplied from the separating unit 510 based on the decoding method information 58, and outputs the restored quantized transform coefficient 51 that is a decoded version of the quantized transform coefficient 13. In addition, the mode decoding unit 513 decodes the code supplied from the separating unit 510 to obtain the mode information 31. The mode information 31 contains information necessary for decoding other than the transform coefficient such as parameters relating to quantization such as the quantization parameter QP and the quantization matrix and the prediction mode information 52 as described above. The parameters relating to quantization are supplied to the decoding control unit 530. The prediction mode information 52 is supplied to the predictor 505 as described above.

Figure 25:
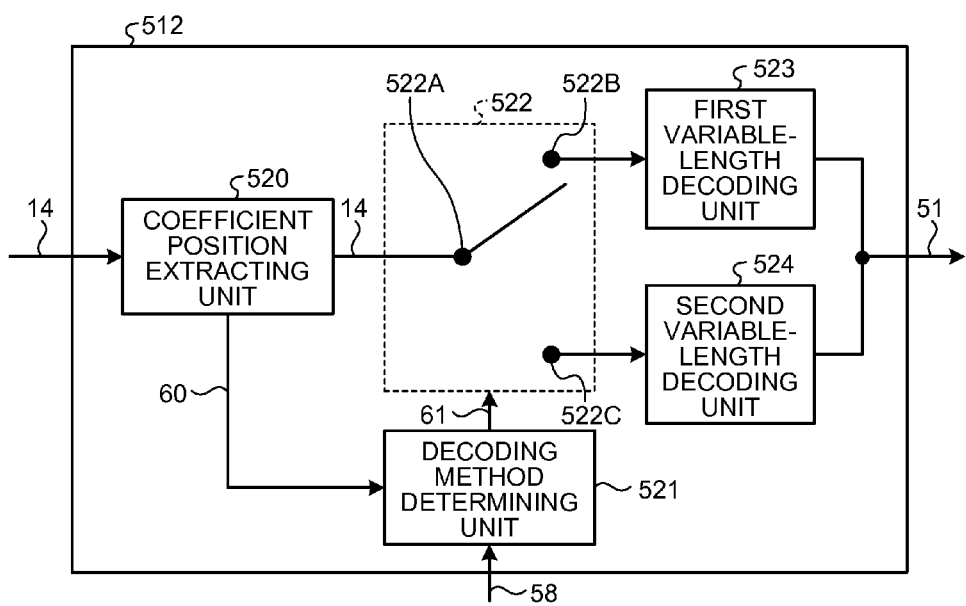
FIG. 25 is a diagram illustrating a coefficient decoding unit according to the fourth embodiment.

FIG. 25 is a block diagram illustrating an example of a configuration of the coefficient decoding unit 512. The coefficient decoding unit 512 includes a coefficient position extracting unit 520, a decoding method determining unit 521, and a switching unit 522, as well as a first variable-length decoding unit 523 and a second variable-length decoding unit 524.

The coefficient position extracting unit 520 has functions similar to those of the coefficient position extracting unit 120 described with reference to FIG. 5 in the first embodiment described above. Specifically, the coefficient position extracting unit 520 supplies the supplied coded data 14 to an input terminal 522A of the switching unit 522, and obtains coefficient position information 60 indicating coefficient positions of a code to be decoded from the coded data 14. For example, the coefficient positions can be known by sequentially counting decoding of the transform coefficients for each sub-block (small block) according to the syntax of the block illustrated in FIG. 17B. Note that the coefficient position information 60 may be expressed by position groups into which the positions in the small block are grouped as described with reference to FIGS. 6A and 6B.

The switching unit 522 switches between output terminals 522B and 522C according to a switching signal 61 output from the decoding method determining unit 521, which will be described later. The first variable-length decoding unit 523 and the second variable-length decoding unit 524 are connected to the output terminals 522B and 522C, respectively. Thus, the coded data 14 supplied to the input terminal 522A are supplied to either one of the first variable-length decoding unit 523 and the second variable-length decoding unit 524 according to the switching signal 61.

The coefficient position information 60 is supplied to the decoding method determining unit 521. In addition, the decoding method information 58 is also supplied to the decoding method determining unit 521. The decoding method determining unit 521 outputs the switching signal 61 for each coefficient position or for each position group based on the coefficient position information 60 and the decoding method information 58, and supplies the switching signal 61 to the switching unit 522.

As a result, the switching unit 522 is switched in units of a coefficient position or in units of a position group based on the decoding method information 58, and the coded data 14 output from the coefficient position extracting unit 520 are adaptively supplied to the first variable-length decoding unit 523 or the second variable-length decoding unit 524 in units of a coefficient position or a position group.

The first variable-length decoding unit 523 performs decoding (referred to as first variable-length decoding) corresponding to the coding performed by the first variable-length coding unit 123 on the supplied coded data 14. Specifically, since the first variable-length coding unit 123 performs single-symbol coding of coding one symbol at a time, the first variable-length decoding unit 523 performs decoding on the coded data 14 by a single-symbol decoding method of decoding one symbol at a time, and outputs the restored quantized transform coefficient 51. For example, when Golomb-Rice coding is used in the first variable-length coding unit 123, the first variable-length decoding unit 523 decodes the coding parameter k and decodes a symbol by using the coding parameter k.

The second variable-length decoding unit 524 performs decoding (referred to as second variable-length decoding) corresponding to the coding performed by the second variable-length coding unit 124 on the supplied coded data 14. Specifically, since the second variable-length coding unit 124 performs multiple-symbol coding of coding a plurality of symbols at a time, the second variable-length decoding unit 524 performs multiple-symbol decoding of decoding a code string and output a plurality of symbols at a time, and outputs the restored quantized transform coefficients 51. For example, when run-length encoding is used in the second variable-length coding unit 124, the series of symbols is expressed by the value ("value") and the number of runs ("run") of the data.

Figure 26:
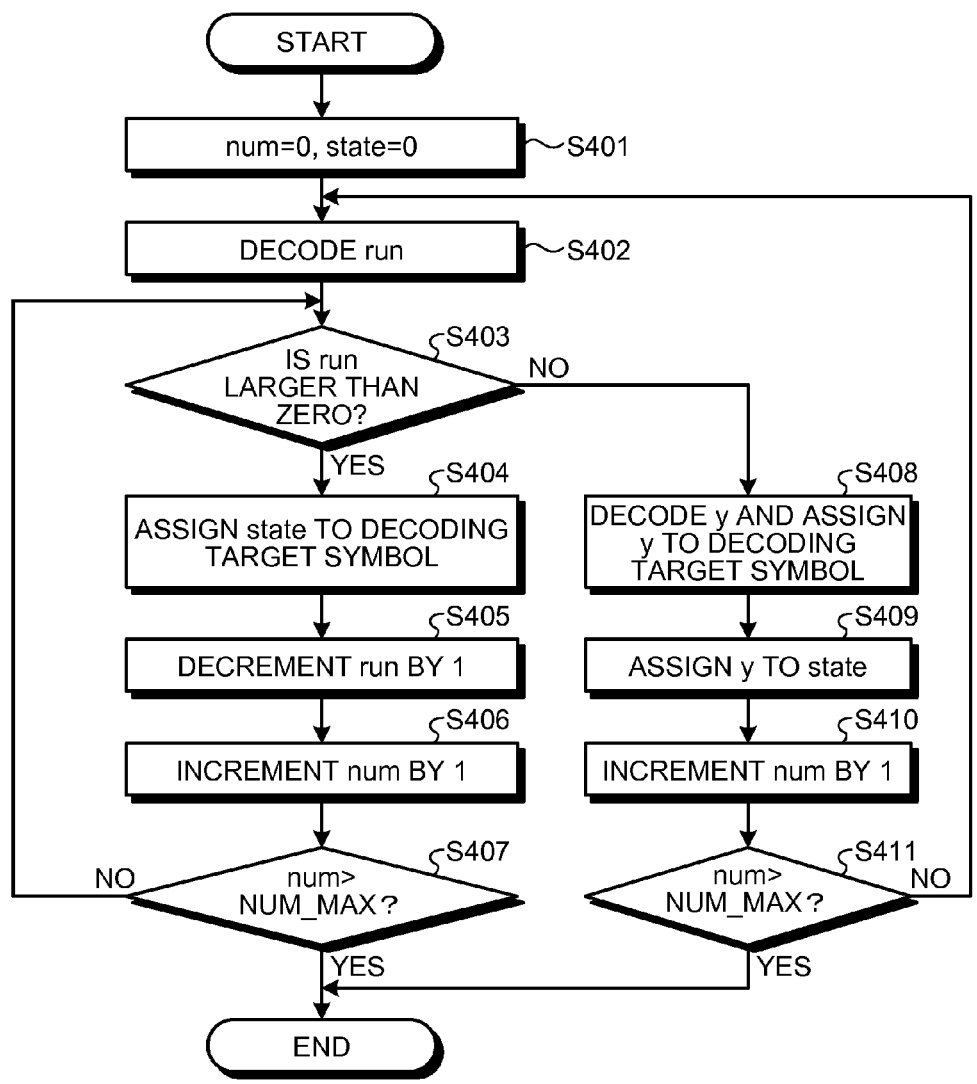
FIG. 26 is a flowchart illustrating procedures for decoding a run-length code.

FIG. 26 is a flowchart illustrating procedures for decoding a run-length code. Processes in the flowchart illustrated in FIG. 26 are performed at the second variable-length decoding unit 524. Note that it is assumed here that the total number NUM_MAX of symbols to be coded is known.

First, the coding target symbol position "num" and the state "state" are initialized by setting the both to 0 (step S401). Next, the number of runs "run" is decoded (step S402), and it is determine whether or not the decoded number of runs "run" is larger than 0 in the next step S403. If it is determined that the number of runs "run" is larger than 0 ("YES" in step S403), the process proceeds to step S404.

In step S404, the value of the state "state" is assigned to the decoding target symbol. Then, the number of runs "run" is decremented by 1 in the next step S405, and the coding target symbol position "num" is incremented by 1 in the next step S406. Then, it is determined in the next step S407 whether or not the value indicating the coding target symbol position "num" exceeds the value indicating the total number NUM_MAX of symbols to be decoded. If it is determined that "num" does not exceed "NUM_MAX" ("NO" in step S407), the process returns to step S403, where it is determined whether or not the number of runs "run" is larger than 0.

On the other hand, if it is determined in step S407 that the value indicating the coding target symbol position "num" exceeds the value indicating the total number NUM_MAX of symbols to be decoded, it is determined that processes for all the decoding target symbols are terminated, and the series of processes are terminated.

If it is determined that the number of runs "run" is 0 in step S403 described above, the process proceeds to step S408 ("NO" in step S403). In step S408, the next code is decoded by a decoding method corresponding to the coding method (Golomb-Rice coding, for example) used for coding the value ("value") of a symbol other than that held by the second variable-length coding unit 124 described above, and a value y resulting from decoding is assigned to the decoding target symbol. Then, in the next step S409, the value y is assigned to the state "state", and in the next step S410, the coding target symbol position "num" is incremented by 1.

After the coding target symbol position "num" is incremented in step S410, the process proceeds to step S411, where it is determines whether or not the value indicating the coding target symbol position "num" exceeds the value indicating the total number NUM_MAX of symbols to be decoded. If it is determined that "num" does not exceed "NUM_MAX" ("NO" in step S411), the process returns to step S402, where the next number of runs "run" is decoded.

On the other hand, if it is determined in step S411 that the value indicating the coding target symbol position "num" exceeds the value indicating the total number NUM_MAX of symbols to be decoded, it is determined that processes for all the decoding target symbols are terminated, and the series of processes are terminated.

Note that the value of the state "state" may be fixed to 0 in the processes illustrated in the flowchart of FIG. 26 similarly to the processes of the flowchart of FIG. 8 described above.

Next, examples of coding according to syntax will be described in more detail. First, processes for decoding the coded data 14 obtained by sequentially coding the small blocks 11 in the image block 10 according to the syntaxes illustrated in FIGS. 17A to 17C described above will be described.

As already described, the syntaxes in this case include syntaxes of the header (see FIG. 17A), a block (see FIG. 17B) and a sub-block (see FIG. 17C). The syntax of the sub-block is embedded in the syntax of the block. Header information is described in the syntax of the header. Data necessary for each image block 10 are described in the syntax of the block. Data necessary for each small block 11 are described in the syntax of the sub-block.

For example, the decoding control unit 530 can appropriately decode the coded data 14 by controlling the decoding on the coded data 14 according to these syntaxes.

A flag CodingMethodFlag[pos] for switching the variable-length decoding method for each coefficient position [pos] is described in the syntax of the header illustrated in FIG. 17A. In FIG. 17A, the value NUM_POS is the number of coefficient positions or the number of coefficient position groups.

The prediction mode "pred_mode", the index value CodingParamIdx[pos] that is a coding parameter (such as the coding parameter k in Golomb-Rice coding) for each coefficient position [pos] are specified in the syntax of the block illustrated in FIG. 17B. Furthermore, the sub-block "sub-block( )" for decoding the transform coefficients in units of a small block [blk] in the image block is embedded. The value NUM_BLK is the number of small blocks in the image block.

The prediction mode "pred_mode" and the index value CodingParamIdx[pos] may be switched and described for each segment "seg" including a plurality of small blocks. In the syntax illustrated in FIG. 17B, the image block is divided into a number of segments "seg", the number indicated by the value NUM_SEG. Note that the number of runs "run" and the state "state" used in decoding employing run-length encoding are initialized to 0 in units of an image block or in units of a segment.

The transform coefficients for each small block are described in the syntax of the sub-block illustrated in FIG. 17C. As illustrated in FIG. 17C, the flag CodingMethodFlag [pos] for switching between the variable length decoding methods for each coefficient position [pos] is determined. If the flag CodingMethodFlag[pos] is determined to be the value TRUE as a result, the first variable-length decoding that is a decoding method of decoding one symbol at a time such as Golomb-Rice coding is applied. In this case, the coefficient "coef[blk][pos]" at the coefficient position [pos] of the small block [blk] is coded by using the index value CodingParamIdx[pos].

On the other hand, if the flag CodingMethodFlag[pos] is determined to be the value FALSE, the second variable-length decoding capable of decoding a plurality of symbols at a time such as run-length encoding is applied. In this case, if the coefficient "coef[blk][pos]" is equal to the state "state [pos]", 1 is added to the number of runs "run[pos]" and the decoded data are not presented.

On the other hand, if the coefficient "coef[blk][pos]" is not equal to the state "state[pos]", the coefficient is decoded by a variable-length decoding method in which the number of runs "run[pos]" and the state "state[pos]" are switched by the flag CodingMethodFlag[pos]. Then, 0 is assigned to the number of runs "run[pos]" and the coefficient "coef[blk][pos]" is assigned to the state "state[pos]".

After processing of all the small blocks is completed, the number of runs "run[pos]" is described only if the number of runs "run[pos]" at a coefficient position [pos] to which the second variable-length coding is applied is a value of 0 or larger.

Next, processes of decoding the coded data 14 obtained by coding the quantized transform coefficient 13 for each coefficient position [pos] according to the syntaxes illustrated in FIGS. 18A and 18B described above will be described.

As already described, the syntaxes in this case include syntaxes of the header (see FIG. 18A) and a block (see FIG. 18B). Header information similar to that in FIG. 17A is described in the syntax of the header. The block contains data forming the image block 10 in the coded data 14.

In the syntax of the block illustrated in FIG. 18B, processing is performed for each coefficient position [pos] unlike the syntax of the block described with reference to FIG. 17B. First, the flag CodingMethodFlag[pos] for switching between the variable-length decoding methods for each coefficient position [pos] is determined. If the flag CodingMethodFlag [pos] is determined to be the value TRUE as a result, the first variable-length decoding that is a decoding method of decoding one symbol at a time such as Golomb-Rice coding is applied to all the transform coefficients of the coefficient position [pos]. In this case, the coefficient "coef[blk][pos]" at the coefficient position [pos] of the small block [blk] is coded by using the index value CodingParamIdx[pos].

On the other hand, if the flag CodingMethodFlag[pos] is determined to be the value FALSE, the second variable-length decoding capable of decoding a plurality of symbols at a time such as run-length encoding is applied to all the transform coefficients at the coefficient position [pos]. In this case, if the coefficient "coef[blk][pos]" is equal to the state "state [pos]", 1 is added to the number of runs "run[pos]" and the decoded data are not presented.

On the other hand, if the coefficient "coef[blk][pos]" is not equal to the state "state[pos]", the coefficient is decoded by a variable-length decoding method in which the number of runs "run[pos]" and the state "state[pos]" are switched by the flag CodingMethodFlag[pos]. Then, 0 is assigned to the number of runs "run[pos]" and the coefficient "coef[blk][pos]" is assigned to the state "state[pos]".

After processing of all the small blocks is completed, the number of runs "run[pos]" is described only if the number of runs "run[pos]" at a coefficient position [pos] to which the second variable-length coding is applied is a value of 0 or larger.

Note that decoding in a case where coding is performed by variable-length coding that assigns a code or one or more bits to one symbol to the first variable-length coding unit 123 and the second variable-length coding unit 124 is described above. This is not limited to this example, and the decoding according to the fourth embodiment can also be applied to a case where coding is performed by using variable-length coding that can assign a code of less than one bit to one symbol such as CABAC.

In this case, as described above, coding is performed by switching, for each coefficient position, between the first variable-length coding unit 123 and the second variable-length coding unit 124 having different contexts to be applied to arithmetic coding and different transitions of the contexts by the switching unit 122. Accordingly, correspondingly in the decoding side, the first variable-length decoding unit 523 and the second variable-length decoding unit 524 have different contexts to be applied to the arithmetic coding and different transitions of the contexts corresponding to the first variable-length coding unit 123 and the second variable-length coding unit 124, respectively. Then, the first variable-length decoding unit 523 and the second variable-length decoding unit 524 are applied to each coefficient position by switching therebetween. The frequency of switching the contexts is lowered by coding in an order of the same coefficient positions, and the complexity of decoding can be reduced.

Fifth Embodiment

Next, a fifth embodiment will be described. The fifth embodiment is directed to an example of an image decoding device associated with the image coding device 2 according to the second embodiment described above.

Figure 27:
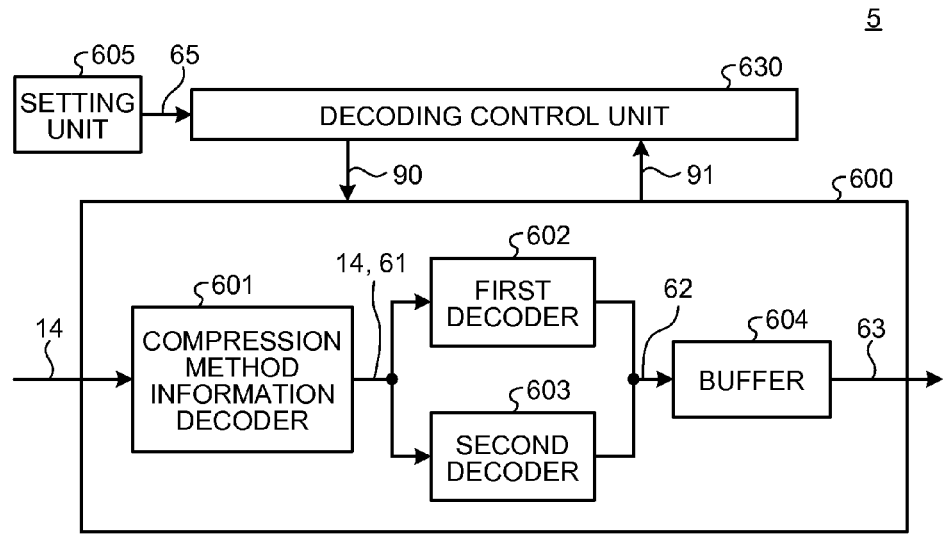
FIG. 27 is a diagram illustrating an image decoding device according to a fifth embodiment.

FIG. 27 is a block diagram illustrating an example of a configuration of an image decoding device 5 that can be applied to the fifth embodiment. The image decoding device 5 includes an image decoding unit 600, a setting unit 605 and a decoding control unit 630. Decoding information 91 such as various parameter information that is supplied and feedback information output based on a result of decoding or the like is supplied to the decoding control unit 630 from the image decoding unit 600. In addition, the decoding control unit 630 generates decoding control information 90 for controlling overall decoding processes performed by the image decoding device 5, and supplies the generated decoding control information 90 to the image decoding unit 600.

The image decoding device 5 has the syntax table giving the syntaxes described with reference to FIGS. 17A to 17C or FIGS. 18A and 18B, extracts each code from the coded data 14 output from the image coding device 2 based on the syntax table and decodes the extracted code by the image decoding unit 600, and outputs decoded image data 63.

In the following, it is assumed that coding has been performed by using the image coding device 2 according to the syntax table giving the syntaxes illustrated in FIGS. 17A to 17C.

The setting unit 605 sets compression rate information 65 indicating the compression rate of the coded data 14 for the decoding control unit 630. The compression rate information 65 is contained in the decoding control information 90, and set for each of a first decoder 602 and a second decoder 603. The compression rate information 65 can be set in advance for the first decoder 602 and the second decoder 603 using the setting unit 605 as input means. Alternatively, target code amount information contained in the mode information 31 and embedded in the coded data 14 may be decoded and set by a compression method information decoder 601, which will be described later, as the compression rate information 65.

The image decoding unit 600 includes the compression method information decoder 601, the first decoder 602, the second decoder 603 and a buffer 604. The coded data 14 input to the image decoding unit 600 is supplied to the compression method information decoder 601. The compression method information decoder 601 extracts the mode information 31 from the supplied coded data 14 according to the syntax and obtains the compression method information 221 contained in the mode information 31. The obtained compression method information 221 is supplied as decoding method switching information 61 to each of the first decoder 602 and the second decoder 603 together with the coded data 14. The decoding method switching information 61 indicates by which of the first decoder 602 and the second decoder 603 the coded data 14 are to be decoded in units or the image block 10. The image decoding unit 600 selects with which of the first decoder 602 and the second decoder 603 the coded data 14 are to be decoded according to the decoding method switching information 61.

The first decoder 602 corresponds to the first coding unit 207 in the second embodiment described above. Specifically, the first decoder 602 performs reverse processing of coding performed by the first coding unit 207 to decode the coded data 14. As a more specific example, the first decoder 602 corresponds to the first coding unit 207, and decodes the coded data 14 by performing quantization through lower-bit compensation in units of the image block 10 and spatial interpolation to obtain a decoded image block 62. The decoded image block 62 is stored in the buffer 604.

The second decoder 603 corresponds to the second coding unit 208 in the second embodiment described above, and has functions equivalent to those of the image decoding unit 600 illustrated in FIG. 23. Specifically, the second decoder 603 decodes the coded data 14 by performing reverse processing of coding performed by the second coding unit 208 to obtain a decoded image block 62. The decoded image block 62 is stored in the buffer 604. The decoded image blocks 62, 62, . . . stored in the buffer 604 are output as decoded image data 63, and output timings thereof are controlled by the decoding control unit 630.

Which of the first variable-length decoding and the second variable-length decoding to used to decode the coded data 14 in the second decoder 603 can be determined based on the compression rate information 65 set by the setting unit 605 according to a method of setting the flag CodingMethodFlag using target code amount described with reference to FIG. 22B, for example.

Sixth Embodiment

Next, a sixth embodiment will be described. The sixth embodiment is directed to an example of an image decoding device associated with the image coding device according to the third embodiment described above. The image decoding device according to the sixth embodiment is different in the configuration from the image decoding device 4 according to the fourth embodiment described with reference to FIG. 23 only in the configuration of the code string decoder 501, and thus this feature will be mainly described in the following.

Figure 28:
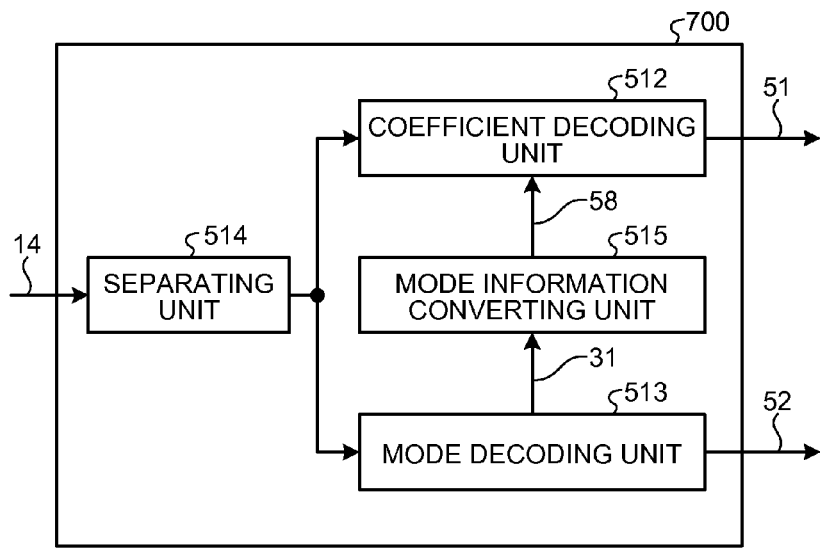
FIG. 28 is a diagram illustrating a code string decoder according to a sixth embodiment.
Figure 29:
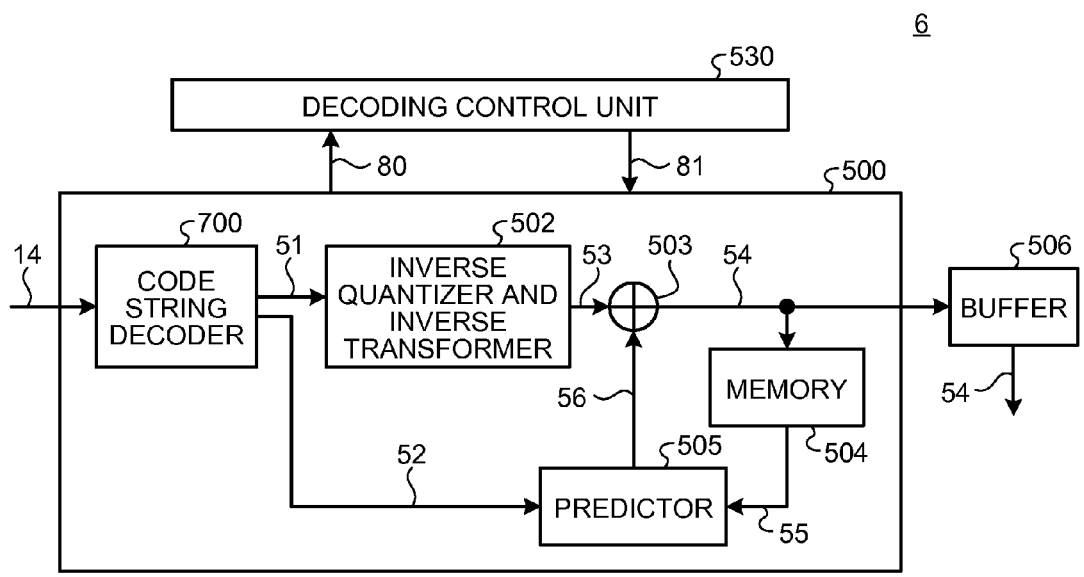
FIG. 29 is a diagram illustrating an image decoding device according to the sixth embodiment.

FIG. 28 is a block diagram illustrating an example of a configuration of a code string decoder 700 according to the sixth embodiment. Note that parts in FIG. 28 that are the same as those in FIG. 24 described above will be designated by the same reference numerals and detailed description thereof will not be repeated. As illustrated in FIG. 29, the code string decoder 501 in the image decoding device 4 illustrated in FIG. 23 is replaced by the code string decoder 700 in an image decoding device 6 according to the sixth embodiment.

The code string decoder 700 includes a separating unit 514, the coefficient decoding unit 512, the mode decoding unit 513 and a mode information converting unit 515. The coded data 14 input to the code string decoder 700 is supplied to the separating unit 514. The separating unit 514 separates a code part resulting from coding the mode information 31 from the supplied coded data 14, and supplies the separated code part to the mode decoding unit 513 according to a syntax table. In addition, the separating unit 514 separates a code part resulting from coding the quantized transform coefficient 13 from the coded data 14, and supplies the separated code part to the coefficient decoding unit 512. Alternatively, the separating unit 514 may supply the supplied coded data 14 to the coefficient decoding unit 512.

The mode decoding unit 513 decodes the code supplied from the separating unit 514 to obtain the mode information 31. The mode information 31 contains information necessary for decoding other than the transform coefficient such as parameters relating to quantization such as the quantization parameter QP and the quantization matrix and the prediction mode information 52 as described above. The mode information 31 is supplied to the mode information converting unit 515.

The mode information converting unit 515 generates decoding method information 58 from the supplied mode information 31, and supplies the decoding method information 58 to the coefficient decoding unit 512. The coefficient decoding unit 512 decodes the coded data 14 supplied from the separating unit 514 based on the decoding method information 58, and outputs restored quantized transform coefficient 51 that is a decoded version of the quantized transform coefficient 13. Specifically, the coefficient decoding unit 512 decodes the coded data 14 by switching between a first decoding method of decoding one symbol at a time and a second decoding method of decoding a plurality of symbols at each coefficient positions at a time in units of a coefficient position according to the decoding method information 58.

Processing of the mode information converting unit 515 will be described in more detail. The mode information converting unit 515 generates the decoding method information 58 based on the quantization parameter QP, the prediction mode information and/or the target code amount information contained as data used as the coding method information 30 for coding of the coded data 14 in the mode information 31 supplied from the mode decoding unit 513.

As a specific example, the mode information converting unit 515 generates the flag CodingMethodFlag[pos] indicating which of the first decoding method and the second decoding method to select based on information used for coding out of the quantization parameter QP, the compression rate (target code amount) and the prediction direction contained in the mode information 31, and the image signal component (luminance component Y, chrominance components U, V) as described with reference to FIGS. 22A to 22D.

According to the sixth embodiment, it is not necessary to transmit information indicating the decoding method for the transform coefficients from the coding side. Accordingly, additional information can be reduced while maintaining the coding efficiency. Moreover, since the flag CodingMethodFlag for specifying the decoding method need not be decoded, the description of the flag CodingMethodFlag[pos] can be eliminated in the syntax as already described.

The embodiments described above are suitably used in when embedded with other related image processing circuits in one LSI (large-scale integration), for example. Alternatively, the image coding device and the image decoding device according to the embodiments described above can obviously be configured alone. In addition, the coded data 14 may be transmitted from the image coding device to the image decoding device via a wired or wireless transmission channel, or may be passed from the image coding device to the image decoding device via a storage medium such as an optical disc or a semiconductor memory.

Other Embodiments

Furthermore, part or the whole of the image coding device or the image decoding device according to the embodiments described above can be configured in software by means of programs in addition to being configured in hardware. When configured in software, programs making a computer system execute the functions of the image coding device or the image decoding device are installed in a computer system including a control unit such as a CPU (central processing unit), a storage unit such as a ROM (read only memory) and a RAM (random access memory), an external storage unit such as a HDD (hard disk drive) and an optical disc drive, a display control unit configured to output a display signal to a display device, and an input/output I/F for connecting a keyboard, a mouse and the like, and inputting and outputting other digital signals. The computer system may further include a communication I/F for connecting to a communication network.

The programs are recorded on a computer readable recording medium such as a CD (compact disk), a flexible disk (FD), and a digital versatile disk (DVD) in a form of a file that can be installed or executed, for example, and provided therefrom.

Alternatively, the programs for implementing the image coding device or the image decoding device according to the embodiments on a computer system may be provided in a manner stored in a computer system connected to a network such as the Internet and downloaded through the network. Still alternatively, the programs for implementing the image coding device or the image decoding device according to the embodiments on a computer system may be provided or distributed through a network such as the Internet.

Still alternatively, the programs for implementing the image coding device or the image decoding device according to the embodiments on a computer system may be embedded on a ROM or the like in advance and provided therefrom.

The programs for implementing the image coding device or the image decoding device according to the embodiments on a computer system have modular structures including the coding control unit 130 and the image coding unit 100 described above, for example, in the case of the image coding device, and the decoding control unit 530 and the image decoding unit 500 described above, for example, in the case of the image decoding device. In an actual hardware configuration, the CPU (processor) reads the programs from the recording medium mentioned above and executes the programs, whereby the respective units described above are loaded on a main storage unit (RAM), and the coding control unit 130 and the image coding unit 100, for example, in the case of the image coding device, and the decoding control unit 530 and the image decoding unit 500, for example, in the case of the image decoding device are generated on the main storage unit.

Other Aspects of the Embodiments

According to another aspect of the embodiments described above, the image coding method further includes a step of embedding, in the coded data, information indicating which of the first variable-length coding step and the second variable-length coding length is sued to perform variable-length coding in units of a coefficient position.

Moreover, in the image coding method, the first variable-length coding step includes performing variable-length coding of coefficients by using one of Golomb-Rice coding, Huffman coding and fixed-length coding.

Furthermore, in the image coding method, the first variable-length coding step includes performing variable-length coding of a coefficient by using one of run-length encoding and skip coding that expresses whether or not all coefficients in a small region obtained by dividing a region including a plurality of blocks are 0.

Furthermore, the image coding method further includes coding information indicating a compression rate and transmitting the coded information to the decoding side.

Furthermore, the image decoding method includes decoding, from the coded data, information indicating which of the first variable-length coding and the second variable-length coding is used to perform variable-length coding in units of a coefficient position is decoded from the coded data; and switching between the first variable-length decoding and the second-variable length decoding in units of a coefficient position according to the decoded information.

Furthermore, in the image decoding method, the first variable-length decoding step includes decoding a coefficient by decoding one of a Golomb-Rice code, a Huffman code and a fixed-length code.

Furthermore, in the image decoding method, the second variable-length decoding step includes decoding a coefficient by decoding one of a run-length code and a skip code that expresses whether or not all transform coefficients in a small region obtained by dividing a region including a plurality of blocks are 0.

Furthermore, the image decoding method further includes a step of decoding information indicating a compression rate that is coded.

Modified Examples of the Embodiments

The invention is not limited to the embodiments presented above, but may be embodied with various modified components in implementation thereof without departing from the scope of the invention. Further, the invention can be embodied in various forms by appropriately combining a plurality of components disclosed in the embodiments. For example, some of the components presented in the embodiment may be omitted. Further, some components in different embodiments may be appropriately combined.

What is claimed is:

1. An image coding method comprising:
    a transforming and quantizing step of orthogonally transforming and quantizing a plurality of blocks within a target region of an input image as a unit to obtain coefficients;
    an aligning step of aligning coefficients among the blocks in accordance with frequency to make a coefficient string, the coefficients in a same coefficient string having a same frequency component;
    a variable-length coding step of variable-length coding the coefficient strings by using different types of variable length coding schemes, the variable-length coding step including switching among the different types of the variable-length coding schemes for each coefficient string; and
    a predicting step of predicting a predicted image of the block by using a reference image that has already been decoded, wherein
    the transforming and the quantizing step includes orthogonally transforming and quantizing a prediction error between the predicted image and the block of the input image to obtain the coefficients;
    the variable-length coding step includes:
        a first variable-length coding step of variable-length coding the coefficient strings by the coefficient; and
        a second variable-length coding step of coding the coefficient strings by variable-length partial data, the variable-length partial data including a variable number of coefficients; and
    the variable-length coding step switches between performing the first variable-length coding step and performing the second variable-length coding step for each coefficient string based on at least one of a quantization width representing a width of the quantization and a prediction direction representing a direction of prediction by the predicting process.

2. The image coding method according to claim 1, wherein the variable-length coding step includes switching between performing the first variable-length coding step and performing the second variable-length coding step for each coefficient string so that the first variable-length coding step is performed on a coefficient string of low frequency components and the second variable-length coding step is performed on a coefficient string of high frequency components when the frequency components are separated into low frequency components including a direct-current component and high frequency components.

3. The image coding method according to claim 2, wherein the variable-length coding step includes:
   widening a range of the low frequency components as the quantization width is smaller; and
   narrowing the range of the low frequency components as the quantization width is larger.

4. The image coding method according to claim 3, wherein the first variable-length coding step includes performing variable-length coding on the coefficients by using Golomb-Rice coding while switching, for each coefficient string within the target region, a parameter indicating a length of a fixed length part of a Golomb-Rice code.

5. The image coding method according to claim 4, further comprising:
   a setting step of setting a compression rate;
   a fixed-length coding step of coding the block with a fixed code length according to the compression rate set in the setting step;
   a determining step of determining whether or not a generated code amount per unit time in coding in the variable-length coding step exceeds a code amount according to the compression rate set in the setting step;
   a coding step of coding the block by the fixed-length coding step when it is determined in the determining step that the generated code amount exceeds the code amount depending on the compression rate, and coding the block by the variable-length coding step when it is determined in the determining step that the generated code amount does not exceed the code amount according to the compression rate; and
   a compression information coding step of coding compression information indicating which of the variable-length coding step and the fixed-length coding step is used for coding in the coding step.

6. The image coding method according to claim 5, wherein the variable-length coding step includes:
   widening the range of the low frequency components as the compression rate is lower, and
   narrowing the range of the low frequency components as the compression rate is higher.

7. The image coding method according to claim 3, wherein the first variable-length coding step includes performing variable-length coding of the coefficients using Huffman coding while switching, for each coefficient string, a probability model for determining a code table used for the Huffman coding.

8. The image coding method according to claim 3, wherein the first variable-length coding step and the second variable-length coding step include performing variable-length coding of the coefficients by using arithmetic coding with use of different contexts between the first variable-length coding step and the second variable-length coding step among contexts indicating transition states of the arithmetic coding.

9. The image coding method according to claim 2, wherein the variable-length coding step includes:
   setting the range of the low frequency components so that a range of horizontal components is wider than a range of vertical components when the direction of prediction by the prediction process is horizontal prediction; and
   setting the range of the low frequency components so that the range of vertical components is wider than the range of horizontal components when the direction of prediction by the prediction process is vertical prediction.

10. An image decoding method comprising:
   a variable-length decoding step of variable-length decoding coded data of each of a plurality of coefficient strings each having coefficients component among a plurality of decoding target blocks within a decoding target region of a decoding target image by using different types of variable-length decoding schemes to obtain the coefficient strings, the coefficients being aligned in accordance with frequency to make the coefficients in a same coefficient string have a same frequency component, wherein
   the coded data are generated by coding coefficients obtained by orthogonally transforming and quantizing an error between a predicted image predicted by using a reference image, which has already been obtained as a result of decoding the image, and the image in units of the block; and
   the variable-length decoding step includes switching among the different types of the variable-length decoding schemes for each coefficient string and the variable-length decoding step switches, on the basis of at least one of a quantization width representing a width of the quantization and a prediction direction representing a direction of prediction by the predicting process, between a first variable-length decoding step of variable-length decoding the coded data by the coefficient and a second variable-length decoding step of the variable-length decoding the coded data by variable-length partial data, the variable-length partial data including a variable number of coefficients; and
   an inverse quantizing and inverse transforming step of inversely quantizing and inversely transforming coefficients of each decoding target block out of the coefficient strings.

11. The image decoding method according to claim 10, wherein
   the variable-length decoding step includes switching between performing the first variable-length decoding step and performing the second variable-length decoding step for each coefficient string so that the first variable-length decoding step is performed on a coefficient string of low frequency components and the second variable-length decoding step is performed on a coefficient string of high frequency components when the frequency components are separated into low frequency components including a direct-current component and high frequency components.

12. The image decoding method according to claim 11, wherein
   the variable-length decoding step includes:
      widening a range of the low frequency components as the quantization width is smaller; and
      narrowing the range of the low frequency components as the quantization width is larger.

13. The image decoding method according to claim 12, wherein
   the first variable-length decoding step includes performing variable-length decoding of a Golomb-Rice code to decode the coefficients from the coded data while switching, for each coefficient string within the target region, a parameter indicating a length of a fixed length part of the Golomb-Rice code.

14. The image decoding method according to claim 13, wherein the coded data are generated by coding the image by switching between fixed-length coding of coding the block with a fixed code length and variable-length coding of coding the block using a variable-length code in units of a block according to a compression rate set so that a generated code amount per unit time does not exceed a predetermined code amount, and the method further includes:

a first decoding step of decoding the coded data coded by the fixed-length coding;

a second decoding step of decoding the coded data coded by the variable-length coding by switching between performing the first variable-length decoding step and performing the second variable-length decoding step in the switching;

a coding method information decoding step of decoding coding method information supplied together with the coded data and indicating which of the fixed-length coding and the variable-length coding is used to code the coded data; and a selecting step of selecting one of performing the first decoding step and performing the second decoding step according to the coding method information decoded in the coding method information decoding step.

15. The image decoding method according to claim 14, wherein the variable-length decoding step includes:

widening the range of the low frequency components as the compression rate is lower; and narrowing the range of the low frequency components as the compression rate is higher.

16. The image decoding method according to claim 12, wherein the first variable-length decoding step includes decoding the coefficients from the coded data by performing variable-length decoding of a Huffman code while switching, for each coefficient string, a probability model for determining a code table used for generating the Huffman code.

17. The image decoding method according to claim 12, wherein the first variable-length decoding step and the second variable-length decoding step include performing variable-length decoding of an arithmetic code to decode the coefficients from the coded data with use of different contexts between the first variable-length decoding step and the second variable-length decoding step among contexts indicating transition states of arithmetic coding that generates the arithmetic code.

18. The image decoding method according to claim 11, wherein the switching step includes:

setting the range of the low frequency components so that a range of horizontal components is wider than a range of vertical components when the direction of prediction by the prediction process is horizontal prediction, and setting the range of the low frequency components so that the range of vertical components is wider than the range of horizontal components when the direction of prediction by the prediction process is vertical prediction.

19. The image coding method according to claim 1, wherein the variable-length coding step further uses signal components of the input image in addition to the quantization width and the prediction direction, and the variable-length coding step switches between the first variable-length coding step and the second variable-length coding step for each coefficient string on the basis of at least one of the quantization width, the prediction direction, and the signal components of the input image.

20. The image decoding method according to claim 10, wherein the variable-length decoding step further uses signal components of the input image in addition to the quantization width and the prediction direction, and the variable-length decoding step switches between the first variable-length decoding step and the second variable-length decoding step for each coefficient string on the basis of at least one of the quantization width, the prediction direction, and the signal components of the input image.

21. An image coding apparatus comprising:

a transformer and quantizer that orthogonally transforms and quantizes a plurality of blocks within a target region of an input image as a unit to obtain coefficients;

a variable-length coder that performs variable-length coding on coefficient strings each having coefficients aligned in accordance with frequency to make the coefficients in a same coefficient string have a same frequency component, the variable-length coding being performed by using different types of variable-length coding schemes, the variable-length coder switching among the different types of the variable-length coding schemes for each coefficient string; and a predictor that predicts a predicted image of the block by using a reference image that has already been decoded, wherein the transformer and quantizer orthogonally transforms and quantizes a prediction error between the predicted image and the block of the input image to obtain the coefficients;

the variable-length coder includes:

a first variable-length coder that performs variable-length coding on the coefficient strings by the coefficient; and a second variable-length coder that codes the coefficient strings by a variable-length partial data, the variable-length partial data including a variable number of coefficients; and the variable-length coder switches between performance by the first variable-length coder and performance by the second variable-length coder for each coefficient string based on at least one of a quantization width representing a width of the quantization and a prediction direction representing a direction of prediction by the predicting process.

22. An image decoding apparatus comprising:

a variable-length decoder that performs variable-length decoding on coded data of each of a plurality of coefficient strings each having coefficients among a plurality of decoding target blocks within a decoding target region of a decoding target image by using different types of variable-length decoding schemes to obtain the coefficient strings, the coefficients being aligned in accordance with frequency to make the coefficients in a same coefficient string have a same frequency component, wherein the coded data are generated by coding coefficients obtained by orthogonally transforming and quantizing an error between a predicted image predicted by using a reference image, which has already been obtained as a result of decoding the image, and the image in units of the block; and the variable-length decoder switches among the different types of the variable-length decoding schemes for each coefficient string and the variable-length decoder switches, on the basis of at least one of a quantization width representing a width of the quantization and a prediction direction representing a direction of prediction by the predicting process, between the first variable-length decoding on the coded data by the coefficient and second variable-length decoding on the coded data by variable-length partial data, the variable-length partial data including a variable number of coefficients; and an inverse quantizer and inverse transformer that inversely quantizes and inversely transforms coefficients of each decoding target block out of the coefficient strings.

* * * * *